(12) United States Patent
Harada et al.

(10) Patent No.: US 11,053,401 B2
(45) Date of Patent: Jul. 6, 2021

(54) METAL DISPERSION LIQUID AND IMAGE RECORDING METHOD

(71) Applicant: FUJIFILM CORPORATION, Tokyo (JP)

(72) Inventors: Motoi Harada, Kanagawa (JP); Naoharu Kiyoto, Kanagawa (JP); Akira Ichiki, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 16/794,245

(22) Filed: Feb. 19, 2020

(65) Prior Publication Data

US 2020/0181434 A1 Jun. 11, 2020

Related U.S. Application Data

(63) Continuation of application No. PCT/JP2018/025108, filed on Jul. 2, 2018.

(30) Foreign Application Priority Data

Aug. 21, 2017 (JP) .............................. JP2017-158891

(51) Int. Cl.
| | | |
|---|---|---|
| *C09D 11/322* | (2014.01) | |
| *B41M 5/00* | (2006.01) | |
| *C09D 11/033* | (2014.01) | |
| *C09D 11/037* | (2014.01) | |
| *C09D 11/04* | (2006.01) | |
| *C09D 11/38* | (2014.01) | |
| *B41J 2/21* | (2006.01) | |

(52) U.S. Cl.
CPC ........... *C09D 11/322* (2013.01); *B41J 2/2107* (2013.01); *B41M 5/0017* (2013.01); *C09D 11/033* (2013.01); *C09D 11/037* (2013.01); *C09D 11/04* (2013.01); *C09D 11/38* (2013.01)

(58) Field of Classification Search
CPC ... C09D 11/036; C09D 11/033; C09D 11/037; C09D 11/04; C09D 11/38; C09D 11/322; C09D 11/36; C09D 11/40; C09D 11/30; C09D 11/32; C09D 11/324; C09D 11/328; C09D 11/101; C09D 11/102; C09D 11/005; C09D 11/54; C09D 11/52; C09D 11/106; B41J 2/2107; B41J 2/01; B41J 2/211; B41J 2/17; B41J 2/17593; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1433; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | | |
|---|---|---|---|---|
| 2009/0258202 | A1* | 10/2009 | Sakaguchi | C09D 11/52 428/206 |
| 2010/0046072 | A1 | 2/2010 | Matsunami | |
| 2012/0174824 | A1 | 7/2012 | Takenaka et al. | |
| 2015/0077489 | A1* | 3/2015 | Oyanagi | B41J 2/2107 347/100 |

(Continued)

FOREIGN PATENT DOCUMENTS

| | | |
|---|---|---|
| JP | 2008-1844 A | 1/2008 |
| JP | 2010-70841 A | 4/2010 |

(Continued)

OTHER PUBLICATIONS

International Search Report issued in International Application No. PCT/JP2018/025108 dated Aug. 7, 2018.

(Continued)

*Primary Examiner* — Manish S Shah
(74) *Attorney, Agent, or Firm* — SOLARIS Intellectual Property Group, PLLC

(57) ABSTRACT

Provided are a metal dispersion liquid which includes tabular metal particles A having an average aspect ratio of greater than 20, which is a ratio of an average equivalent circle diameter to an average thickness, and an average equivalent circle diameter of 50 nm to 1000 nm, metal particles B having an average aspect ratio of 1 to 15 and an average equivalent circle diameter of 1 nm to 150 nm, and water, in which an average equivalent circle diameter A1 of the tabular metal particles A and an average equivalent circle diameter B1 of the metal particles B satisfy Expression (1), and a content a of the tabular metal particles A and a content b of the metal particles B with respect to a total mass of the metal dispersion liquid satisfy Expression (2); and an application thereof.

$A1 > B1$   Expression (1)

$0.0001 \leq b/(a+b) \leq 0.3$   Expression (2)

15 Claims, No Drawings

(56) References Cited

U.S. PATENT DOCUMENTS

| | | | | |
|---|---|---|---|---|
| 2015/0158323 A1* | 6/2015 | Richert | ............... | C09D 7/61 283/85 |
| 2015/0252157 A1* | 9/2015 | Ogura | ............... | C08F 8/44 427/383.1 |
| 2017/0341411 A1* | 11/2017 | Oyanagi | ............... | B41J 2/2107 |

FOREIGN PATENT DOCUMENTS

| | | | |
|---|---|---|---|
| JP | 2011-52041 | A | 3/2011 |
| JP | 2012-52198 | A | 3/2012 |
| JP | 2014-70246 | A | 4/2014 |
| JP | 2014-70255 | A | 4/2014 |
| JP | 2014-118589 | A | 6/2014 |

OTHER PUBLICATIONS

Written Opinion of the ISA issued in International Application No. PCT/JP2018/025108 dated Aug. 7, 2018.

English language translation of the following: Office action dated Nov. 17, 2020 from the JPO in a Japanese patent application No. 2019-537963 corresponding to the instant patent application.

English language translation of the following: Office action dated Apr. 6, 2021 from the JPO in a Japanese patent application No. 2019-537963 corresponding to the instant patent application.

* cited by examiner

METAL DISPERSION LIQUID AND IMAGE RECORDING METHOD

CROSS-REFERENCE TO RELATED APPLICATIONS

This application is a continuation application of International Application No. PCT/JP2018/025108, filed Jul. 2, 2018, the disclosure of which is incorporated herein by reference in its entirety. Further, this application claims priority from Japanese Patent Application No. 2017-158891, filed Aug. 21, 2017, the disclosure of which is incorporated herein by reference in its entirety.

BACKGROUND OF THE INVENTION

1. Field of the Invention

The present disclosure relates to a metal dispersion liquid, an image recording method, and a recorded object. 2. Description of the Related Art In the related art, a metal dispersion liquid used for forming a film having a light-shielding property, a heat-shielding property, and the like has been known.

For example, as a metal fine particle-containing composition which has excellent heat resistance and in which a change in the particle size, the shape, or the like of metal fine particles due to a heat treatment is suppressed even in a case where the composition contains metal fine particles having a particle size that causes melting point depression, a metal fine particle-containing composition which contains metal fine particles and a heterocyclic compound containing at least one sulfur atom has been known (for example, see JP2008-001844A).

Further, a metal tabular particle dispersion liquid that enables production of a heat ray shielding material with excellent heat shielding performance and an excellent visible light transmittance, a metal tabular particle dispersion liquid which contains tabular metal particles A, each of which has a triangular or hexagonal to circular main surface, and metal particles, each of which has a shape other than the tabular shape with a triangular or hexagonal to circular main surface, in which the ratio of the metal particles B having an equivalent circle diameter of 40 nm or greater is 30% by number or less with respect to the total amount of the metal particles A and the metal particles B has been known (for example, see JP2014-070246A).

SUMMARY OF THE INVENTION

Meanwhile, a metal dispersion liquid containing metal particles is required to be able to form a film (for example, an image) with excellent glossiness in some cases. Particularly in a case where the metal dispersion liquid containing metal particles is used for recording or decorating an image, it is desirable that a film having excellent glossiness, that is, specular glossiness can be formed.

According to the present inventors, it is effective that tabular metal particles are selected as metal particles in a metal dispersion liquid and the aspect ratio of the tabular metal particles is raised in order to form a film having specular glossiness. In the film formed using a metal dispersion liquid containing tabular metal particles having a large aspect ratio, the specular glossiness is considered to be obtained because the aligning properties of the tabular metal particles are improved, and scattering of light on a side surface (that is, a surface other than two main planes) of each tabular metal particle is suppressed.

Further, the present inventors found that a film with a suppressed tint can be formed in a case of using a metal dispersion liquid containing tabular metal particles having a large aspect ratio. In the metal particles having a particle size less than or equal to the wavelength in a visible range, plasmon resonance occurs. Therefore, in the metal dispersion liquid containing metal particles, the metal particles absorb light having a specific wavelength in a visible range due to the plasma resonance, and thus a film to be formed is tinted in some cases. It is considered that in a case where the metal particles in the metal dispersion liquid are tabular metal particles having a large aspect ratio, the absorption wavelength of the metal particles resulting from plasmon resonance is on a long wavelength side, that is, in an infrared region, and thus a film with a suppressed tint can be formed.

However, it was also found that the dispersion stability is degraded in the metal dispersion liquid containing tabular metal particles with a large aspect ratio. Typically, the equivalent circle diameter of metal particles increases in a case where the aspect ratio of the metal particles increases. Since the metal particles having a large equivalent circle diameter have a large surface area and a strong van der Waals force, the metal particles tend to easily aggregate.

An object of an embodiment of the present invention is to provide a metal dispersion liquid which has excellent dispersion stability and specular glossiness and enables formation of a film with a suppressed tint.

Further, an object of another embodiment of the present invention is to provide an image recording method which enables recording of an image having specular glossiness and a suppressed tint.

The means for achieving the above-described objects includes the following aspects.

<1> A metal dispersion liquid comprising: tabular metal particles A having an average aspect ratio of greater than 20, which is a ratio of an average equivalent circle diameter to an average thickness, and an average equivalent circle diameter of 50 nm to 1000 nm; metal particles B having an average aspect ratio of 1 to 15 and an average equivalent circle diameter of 1 nm to 150 nm; and water, in which an average equivalent circle diameter A1 of the tabular metal particles A and an average equivalent circle diameter B1 of the metal particles B satisfy Expression (1), and a content a of the tabular metal particles A and a content b of the metal particles B with respect to a total mass of the metal dispersion liquid satisfy Expression (2).

$$A1 > B1 \quad \text{Expression (1)}$$

$$0.0001 \leq b/(a+b) \leq 0.3 \quad \text{Expression (2)}$$

<2> The metal dispersion liquid according to <1>, in which the average aspect ratio of the metal particles B is 1 or greater and less than 8.

<3> The metal dispersion liquid according to <1> or <2>, in which the tabular metal particles A contain at least one metal element selected from the group consisting of silver, gold, and platinum.

<4> The metal dispersion liquid according to any one of <1> to <3>, in which the tabular metal particles A contain silver.

<5> The metal dispersion liquid according to any one of <1> to <4>, in which the content a of the tabular metal particles A and the content b of the metal particles B with respect to the total mass of the metal dispersion liquid satisfy Expression (2-1).

$$0.0001 \leq b/(a+b) \leq 0.2 \quad \text{Expression (2-1)}$$

<6> The metal dispersion liquid according to any one of <1> to <5>, in which the content a of the tabular metal particles A and the content b of the metal particles B with respect to the total mass of the metal dispersion liquid satisfy Expression (2-2).

$$0.0001 \leq b/(a+b) \leq 0.15 \qquad \text{Expression (2-2)}$$

<7> The metal dispersion liquid according to any one of <1> to <6>, in which the average equivalent circle diameter of the tabular metal particles A is in a range of 50 nm to 500 nm.

<8> The metal dispersion liquid according to any one of <1> to <7>, in which the average equivalent circle diameter of the metal particles B is in a range of 1 nm to 120 nm.

<9> The metal dispersion liquid according to any one of <1> to <8>, further comprising: a dispersant.

<10> The metal dispersion liquid according to <9>, in which the dispersant is gelatin.

<11> The metal dispersion liquid according to any one of <1> to <10>, which is used as an ink.

<12> The metal dispersion liquid according to <11>, which is used for ink jet recording.

<13> An image recording method comprising: a step of applying the metal dispersion liquid according to any one of <1> to <12> onto a base material using an ink jet method.

According to an embodiment of the present invention, it is possible to provide a metal dispersion liquid which has excellent dispersion stability and specular glossiness and enables formation of a film with a suppressed tint.

According to another embodiment of the present invention, it is possible to provide an image recording method which enables recording of an image having specular glossiness and a suppressed tint.

DESCRIPTION OF THE PREFERRED EMBODIMENTS

Hereinafter, examples embodiments of a metal dispersion liquid and an image recording method, to which the present invention has been applied, will be described. However, the present invention is not limited to the following embodiments, and modifications can be made as appropriate within the range of the purpose of the present invention.

Further, the numerical ranges shown using "to" in the present disclosure indicate ranges including the numerical values described before and after "to" as the minimum values and the maximum values.

In the numerical ranges described in a stepwise manner in the present disclosure, the upper limits or the lower limits described in certain numerical ranges may be replaced with the upper limits or the lower limits in other numerical ranges described in a stepwise manner. Further, in the numerical ranges described in the present specification, the upper limits or the lower limits described in certain numerical ranges may be replaced with values described in examples.

In the present disclosure, combinations of two or more preferable aspects are more preferable aspects.

In the present disclosure, the amount of each component indicates the total amount of a plurality of kinds of materials in a case where a plurality of kinds of materials are present in the corresponding component.

In the present disclosure, the "steps" include not only independent steps but also steps whose intended purposes are achieved even in a case where the steps cannot be precisely distinguished from other steps.

In the present disclosure, the concept of "light" includes active energy rays such as γ rays, β rays, electron beams, ultraviolet rays, visible rays, and infrared rays.

In the present disclosure, "tabular metal particles A and metal particles B" are also referred to as "metal particles".

The "average aspect ratio" of the metal particles" (that is, tabular metal particles A and metal particles B) in the present disclosure indicates the ratio [average equivalent circle diameter/average thickness] of the average equivalent circle diameter to the average thickness in the metal particles (that is, tabular metal particles A and metal particles B).

The methods of acquiring the average thickness, the average equivalent circle diameter, and the average aspect ratio will be described below.

The "specular glossiness" of a film (for example, an image) in the present disclosure indicates glossiness high enough to reflect an object facing the film (for example, an image) and is distinguished from simple metal gloss (for example, see "evaluation standards for "(2) sensory evaluation" of "1. specular glossiness of image" in examples described below).

In the present disclosure, the "specular glossiness" of a film (for example, an image) is evaluated based on the 20° gloss value and the sensory evaluation (visual observation).

As the numerical value of the 20° gloss value is increased, this indicates that the specular glossiness of an image is excellent.

In the present disclosure, the "tint" of a film (for example, an image) is evaluated based on the metric saturation value. As the metric saturation number is decreased, this indicates that the tint of a film (for example, an image) image is suppressed. Further, the state in which "the tint is suppressed" indicates that absorption of light having a specific wavelength in a visible range due to metal particles is suppressed so that the film has a neutral tint.

[Metal Dispersion Liquid]

A metal dispersion liquid according to the embodiment of the present disclosure is a metal dispersion liquid including tabular metal particles A having an average aspect ratio of greater than 20, which is a ratio of an average equivalent circle diameter to an average thickness, and an average equivalent circle diameter of 50 nm to 1000 nm, metal particles B having an average aspect ratio of 1 to 15 and an average equivalent circle diameter of 1 nm to 150 nm, and water, in which an average equivalent circle diameter A1 of the tabular metal particles A and an average equivalent circle diameter B1 of the metal particles B satisfy Expression (1), and a content a of the tabular metal particles A and a content b of the metal particles B with respect to a total mass of the metal dispersion liquid satisfy Expression (2).

$$A1 > B1 \qquad \text{Expression (1)}$$

$$0.0001 \leq b/(a+b) \leq 0.3 \qquad \text{Expression (2)}$$

The metal dispersion liquid according to the embodiment of the present disclosure has excellent dispersion stability. Further, according to the metal dispersion liquid according to the embodiment of the present disclosure, a film which has specular glossiness and a suppressed tint can be formed.

The reason why the metal dispersion liquid according to the embodiment of the present disclosure has such effects is not clear, but the present inventors assumed as follows.

Since the metal dispersion liquid according to the embodiment of the present disclosure contains tabular metal particles A having an average aspect ratio of greater than 20 and an average equivalent circle diameter of 50 nm to 1000 nm as metal particles, a film which has specular glossiness and a suppressed tint can be formed.

It is assumed that since the metal dispersion liquid according to the embodiment of the present disclosure contains tabular metal particles as metal particles and the average aspect ratio of the tabular metal particles is greater than 20, the aligning properties of the tabular metal particles are improved in a film to be formed, scattering of light on a side surface (in other words, a surface other than two main planes) of each tabular metal particles is suppressed, and thus the specular glossiness can be obtained.

For example, in a case where the shape of the metal particle is a shape other than the tabular shape such as a sphere or a cube, the specular glossiness of a film is considered to be degraded because of the impact of light scattering on the surface of the metal particle even in a case where a film having metal glossiness is obtained. Further, even in a case where the metal particles are tabular metal particles, the specular glossiness of a film is considered to be degraded in a case where the aspect ratio of the tabular metal particles is low because of degradation of the aligning properties of the tabular metal particles in the film and the impact of light scattering on a side surface (in other words, a surface other than two main planes) of each tabular metal particle.

Further, it is assumed that since the metal dispersion liquid according to the embodiment of the present disclosure contains tabular metal particles as metal particles and the average equivalent circle diameter of the tabular metal particles is 50 nm or greater, the number of interfaces of between metal particles arranged on a base material is reduced at the time of application of the metal dispersion liquid onto the base material, and thus a film having specular glossiness can be formed.

Meanwhile, in a case where a film is formed using a metal dispersion liquid containing metal particles having a particle size less than or equal to the wavelength in a visible range, a tint is generated in the formed film in some cases. The reason form this is considered as follows. In the metal particles having a particle size less than or equal to the wavelength in a visible range, plasmon resonance occurs. Therefore, in the metal dispersion liquid containing metal particles, the metal particles absorb light having a specific wavelength in a visible range due to the plasma resonance, and thus a film to be formed is tinted in some cases.

On the contrary, the metal dispersion liquid according to the embodiment of the present disclosure contains tabular metal particles A having an average aspect ratio of greater than 20 as metal particles. Therefore, a film with a suppressed tint can be recorded.

The tabular metal particles having an aspect ratio of greater than 20 have an absorption wavelength of the metal particles resulting from plasmon resonance on a long wavelength side, that is, in an infrared region. In other words, it is assumed that a film with a suppressed tint can be formed using the metal dispersion liquid according to the embodiment of the present disclosure because the absorption wavelength resulting from the plasmon resonance is in an infrared range, and the metal dispersion liquid contains metal particles with a low absorbance in a visible light range.

As described above, according to the tabular metal particles A having an average aspect ratio of greater than 20 and an average equivalent circle diameter of 50 nm to 1000 nm, a metal dispersion liquid that enables formation of a film having specular glossiness and a suppressed tint can be realized. However, it was found that the dispersion stability can be degraded in a case of using a metal dispersion liquid containing metal particles having a large aspect ratio such as the tabular metal particles A. Typically, the equivalent circle diameter of metal particles increases in a case where the aspect ratio of the metal particles increases. Metal particles having a large equivalent circle diameter have a large surface area. Since metal particles having a large surface area and a strong van der Waals force, the metal particles tend to easily aggregate.

In addition, the metal dispersion liquid according to the embodiment of the present disclosure contains tabular metal particles A having an average aspect ratio of greater than 20 and an average equivalent circle diameter of 50 nm to 1000 nm and metal particles B having an average aspect ratio of 1 to 15 and an average equivalent circle diameter of 1 nm to 150 nm such that Equation (1) and Equation (2) are satisfied, and thus a film having specular glossiness and a suppressed tint can be formed and the dispersion stability is also excellent.

It is assumed that since the metal dispersion liquid according to the embodiment of the present disclosure contains the tabular metal particles A and a specific amount (that is, an amount set to satisfy Equation (2)) of the metal particles B having an average equivalent circle diameter smaller than that of the tabular metal particles A, aggregation of the tabular metal particles A is suppressed by the metal particles B, and thus the dispersion stability is excellent.

Further, since the content a of the tabular metal particles A and the content b of the metal particles B in the metal dispersion liquid according to the embodiment of the present disclosure satisfy Equation (2), the effect of the tabular metal particles A, that is, the effect of forming a film having specular glossiness and a suppressed tint is unlikely to be impaired by the metal particles B.

Further, since the metal dispersion liquid according to the embodiment of the present disclosure contains the tabular metal particle A as well as the metal particles having an average equivalent circle diameter smaller than that of the tabular metal particles A, the metal particles B enter gaps between the tabular metal particles A which can be generated at the time of application of the metal dispersion liquid onto the base material so that the gaps are filled. It is assumed that the glossiness of the film increases because of the reason described above and thus a film having specular glossiness can be formed.

In contrast to the metal dispersion liquid according to the embodiment of the present disclosure, the metal fine particle-containing composition described in JP2008-001844A is a metal dispersion liquid for forming a film having a light-shielding property, a heat-shielding property, and the like and is not intended to form a film having specular glossiness and a suppressed tint. Further, the metal fine particle-containing composition described in JP2008-001844A is not assumed to contain tabular metal particles having an average aspect ratio of greater than 20 (for example, see paragraph [0041]). In other words, a problem of degradation in dispersion stability of the metal dispersion liquid caused by containing tabular metal particles having an average aspect ratio of greater than 20 does not occur in JP2008-001844A. Further, in the description of JP2008-01844A, it is not assumed that tabular metal particles tend to aggregate and the dispersion stability is degraded in some cases in the metal dispersion liquid containing tabular metal particles having a large aspect ratio. Even in JP2014-070246A, a problem of degradation in dispersion stability of the metal dispersion liquid caused by containing tabular metal particles having an average aspect ratio of greater than 20 is not focused. Furthermore, it is not assumed that the degraded dispersion stability can be improved by allowing a specific amount of metal particles having a small aspect ratio to be present in the metal dispersion liquid.

In addition, the above-described assumption is not intended to limitatively interpret the effects of the present invention, but explains the mechanism as an example.

Hereinafter, each component in the metal dispersion liquid according to the embodiment of the present disclosure will be described in detail.

[Tabular Metal Particles A]

The metal dispersion liquid according to the embodiment of the present disclosure contains tabular metal particles A (hereinafter, also simply referred to as "tabular metal particles A") having an average aspect ratio of greater than 20, which is a ratio of the average equivalent circle diameter to the average thickness, and an average equivalent circle diameter of 50 nm to 1000 nm.

In the present disclosure, the term "tabular" indicates the shape of a particle with two main planes.

The shape of the tabular metal particles A is not particularly limited as long as each particle is tabular, in other words, each particle has two main planes, and the shape thereof can be appropriately selected depending on the purpose thereof.

Examples of the shape of the tabular metal particles A include a triangular shape, a square shape, a hexagonal shape, an octagonal shape, and a circular shape.

As the shape of the tabular metal particles A, from the viewpoint of a low absorbance in a visible light range, a triangular or higher polygonal shape and a circular shape (hereinafter, also referred to as "triangular to circular shapes") are preferable.

The circular shape is not particularly limited as long as the tabular metal particle A has a round shape without corners in a case where the particle is observed in the normal direction of the main plane using a transmission electron microscope (TEM), and can be appropriately selected depending on the purpose thereof.

The triangular or higher polygonal shape is not particularly limited as long as the tabular metal particle A has a triangular or higher polygonal shape in a case where the particle is observed in the normal direction of the main plane using a transmission electron microscope (TEM), and can be appropriately selected depending on the purpose thereof.

The angle of the triangular or higher polygonal shape may be an acute angle or an obtuse angle, but an obtuse angle is preferable from the viewpoint that absorption of light in a visible light range can be reduced.

The proportion of the tabular metal particles A having triangular to circular shapes in the tabular metal particles A is preferably 60% by number or greater, more preferably 65% by number or greater, and still more preferably 70% by number or greater with respect to the total number of tabular metal particles.

In a case where the proportion of the tabular metal particles A having triangular to circular shapes is 60% by number or greater, the absorbance of light in a visible light range is further decreased.

The term "% by number" indicates the proportion (so-called percentage) of the number of tabular metal particles A having triangular to circular shapes in 500 pieces of tabular metal particles A. The "% by number" is acquired by observing 500 pieces of tabular metal particles A in the normal direction of the main planes using a TEM.

The average equivalent circle diameter of the tabular metal particles A is in a range of 50 nm to 1000 nm.

In a case where the average equivalent circle diameter of the tabular metal particles A is 50 nm or greater, the number of interfaces of between metal particles arranged on the base material is reduced at the time of application of the metal dispersion liquid onto the base material, and thus a film having specular glossiness can be formed.

In a case where the average equivalent circle diameter of the tabular metal particles A is 1000 nm or less, since the dispersibility of the tabular metal particles A in the metal dispersion liquid is improved, a metal dispersion liquid with excellent dispersion stability can be realized. Further, in a case where the metal dispersion liquid is used as an ink for ink jet recording, clogging of a nozzle in a ink jet head due to the metal dispersion liquid is suppressed in a case where the average equivalent circle diameter of the tabular metal particles A is 1000 nm or less. Therefore, a metal dispersion liquid with excellent jettability can be realized.

Further, the average equivalent circle diameter of the tabular metal particles A is preferably in a range of 50 nm to 500 nm, more preferably in a range of 50 nm to 400 nm, and still more preferably in a range of 50 nm to 300 nm.

In the present disclosure, the "average equivalent circle diameter of the tabular metal particles A" indicates the number average value of the equivalent circle diameters of 500 pieces of tabular metal particles A.

The equivalent circle diameter of each tabular metal particle A is acquired based on a transmission electron microscope image (TEM image). Specifically, the diameter of a circle having the same area as the area (that is, the projected area) of the tabular metal particle A in a TEM image is set as the equivalent circle diameter.

The example of the method of measuring the average equivalent circle diameter of the tabular metal particles A is as described in the examples below.

The coefficient of variation in the particle size distribution of the tabular metal particles A is preferably 35% or less, more preferably 30% or less, and still more preferably 20% or less.

The "coefficient of variation in the particle size distribution of the tabular metal particles A" indicate a value (%) obtained by dividing the standard deviation of the equivalent circle diameters (particle size distribution) of 500 pieces of tabular metal particles A by the number average value (the average equivalent circle diameter) of the equivalent circle diameters of 500 pieces of tabular metal particles A and multiplying the divided value by 100.

From the viewpoints of the dispersibility of the tabular metal particles A in the metal dispersion liquid and the jettability of the metal dispersion liquid in a case of being used as an ink for ink jet recording, the average thickness of the tabular metal particles A is preferably 50 nm or less, more preferably in a range of 2 nm to 25 nm, and still more preferably in a range of 3 nm to 15 nm.

In the present disclosure, the "average thickness of the tabular metal particles A" indicates the number average value of the thicknesses of 500 pieces of the tabular metal particles A.

The thickness of each tabular metal particle A is measured according to a focused ion beam-transmission electron microscopy (FIB-TEM) method.

The example of the method of measuring the average thickness of the tabular metal particles A is as described in the examples below.

The average aspect ratio (that is, average equivalent circle diameter/average thickness) of the tabular metal particles A is greater than 20.

It is assumed that since the average aspect ratio of the tabular metal particles A is greater than 20, the aligning properties of the tabular metal particles in a film to be formed are improved, scattering of light on a side surface (that is, a surface other than two main planes) of each tabular metal particles is suppressed, and thus the specular gloss can be obtained.

For example, from the viewpoints of suppressing the tint of a film and further improving the specular glossiness of the film, the average aspect ratio of the tabular metal particles A is preferably 22 or greater, more preferably 23.5 or greater, and still more preferably 25 or greater.

The upper limit of the average aspect ratio of the tabular metal particles A is not particularly limited, but is preferably 100 or less, more preferably 60 or less, and still more preferably 40 or less from the viewpoint of the dispersibility of the tabular metal particles A.

The metal element contained in the tabular metal particles A is not particularly limited, and examples thereof include metal elements such as silver, gold, platinum, and aluminum.

From the viewpoint of the specular glossiness of a film (for example, an image), the tabular metal particles A contain preferably at least one metal element selected from the group consisting of silver, gold, or platinum, more preferably at least one metal element selected from silver or gold, and still more preferably silver.

Further, from the viewpoint of suppressing the tint of a film (for example, an image), the tabular metal particles contain preferably at least one metal element selected from silver or platinum and more preferably silver.

For example, from the viewpoint of further improving the specular glossiness of a film (for example, an image), the content of the silver in the tabular metal particles A is preferably 80% by mass or greater and more preferably 90% by mass or greater with respect to the total amount of the tabular metal particles A. The upper limit thereof is not particularly limited, but is typically 100% by mass or less.

The metal dispersion liquid according to the embodiment of the present disclosure may contain one or two or more kinds of tabular metal particles A.

The content of the tabular metal particles A in the metal dispersion liquid according to the embodiment of the present disclosure is not particularly limited.

The content of the tabular metal particles A in the metal dispersion liquid according to the embodiment of the present disclosure is preferably in a range of 0.1% by mass to 50% by mass, more preferably in a range of 0.1% by mass to 30% by mass, and still more preferably in a range of 0.1% by mass to 20% by mass with respect to the total amount of the metal dispersion liquid.

In a case where the content of the tabular metal particles A in the metal dispersion liquid according to the embodiment of the present disclosure is 0.1% by mass or greater with respect to the total amount of the metal dispersion liquid, the specular glossiness of the film is further improved.

In a case where the content of the tabular metal particles A in the metal dispersion liquid according to the embodiment of the present disclosure is 50% by mass or less with respect to the total amount of the metal dispersion liquid, the jettability in the case where the metal dispersion liquid is used as an ink for ink jet recording can be further improved.

~Method of Synthesizing Tabular Metal Particles~

A method of synthesizing the tabular metal particles A is not particularly limited and can be appropriately selected depending on the purpose thereof.

Examples of the method of synthesizing the tabular metal particles A having a triangular or higher polygonal shape include liquid phase methods such as a chemical reduction method, a photochemical reduction method, and an electrochemical reduction method.

Among these, as the method of synthesizing the tabular metal particles A having a triangular or higher polygonal shape, from the viewpoint of controlling the shape and the size, a chemical reduction method or a photochemical reduction method is preferable.

In a case where the tabular metal particles A having a triangular or higher polygonal shape are synthesized, the corners of each tabular metal particle A having a triangular or higher polygonal shape may be made blunt by performing an etching treatment using a dissolution species that dissolves silver, such as nitric acid or sodium nitrite, and an aging treatment through heating after the synthesis.

As the method of synthesizing the tabular metal particles A, a method of fixing a seed crystal onto a surface of a transparent base material such as a film or glass in advance and then allowing crystals of the metal particles (for example, Ag) to grow in a tabular shape may be used in addition to the synthesis method described above.

The method of synthesizing the tabular metal particles A can refer to the description in paragraphs [0041] to [0053] of JP2014-070246A.

The tabular metal particles A may be subjected to another treatment in order to impart desired characteristics.

Another treatment is not particularly limited and can be appropriately selected depending on the purpose thereof.

Examples of another treatment include a treatment of forming a high refractive index shell layer described in paragraphs [0068] to [0070] of JP2014-184688A and a treatment of adding various additives described in paragraphs [0072] and [0073] of JP2014-184688A.

[Metal Particles B]

The metal dispersion liquid according to the embodiment of the present disclosure contains metal particles B (hereinafter, also simply referred to as "metal particles B") having an average aspect ratio of 1 to 15 and an average equivalent circle diameter of 1 nm to 150 nm.

The shape of the metal particles B is not particularly limited.

Examples of the shape of the metal particle B include a spherical shape, a rod shape, and a tabular shape.

The "spherical shape" in the present disclosure includes a perfectly spherical shape, a spheroidal shape, and an oval shape. The "tabular shape" in the metal particles B has the same definition as the "tabular shape" in the tabular metal particles A, and the preferable aspects thereof are the same as described above. Therefore, the description will not be provided here.

Among the examples, a spherical shape is preferable as the shape of the metal particles B.

In a case where the metal particles B has a spherical shape, the dispersion stability of the metal dispersion liquid can be further improved. Further, the specular glossiness of the film can be further improved.

The proportion of the spherical metal particles B in the metal particles B is preferably 40% by number or greater, more preferably 50% by number or greater, and still more preferably 60% by number or greater with respect to the total number of metal particles B.

In a case where the proportion of the spherical metal particles B is 40% by number or greater, the dispersion stability of the metal dispersion liquid can be further improved. Further, the specular glossiness of the film can be further improved.

The term "% by number" indicates the proportion (percentage) of the number of spherical metal particles B in 500 pieces of metal particles B. The "% by number" is acquired by observing 500 pieces of metal particles B in the normal direction of the main planes using a TEM.

The average equivalent circle diameter of the metal particles B is in a range of 1 nm to 150 nm.

In a case where the average equivalent circle diameter of the metal particles B is 1 nm or greater, the shape can be stably controlled, and the production suitability becomes excellent.

In a case where the average equivalent circle diameter of the metal particles B is 150 nm or less, since aggregation of the tabular metal particles A can be suppressed, a metal dispersion liquid with excellent dispersion stability can be realized. Further, in the case where the average equivalent circle diameter of the metal particles B is 150 nm or less, the metal particles B enter gaps between the tabular metal particles A which can be generated at the time of application of the metal dispersion liquid onto the base material so that the gaps are filled. The glossiness of the film is increased in a case where the gaps between the tabular metal particles A are filled with the metal particles B, and thus a film having specular glossiness can be realized.

The average equivalent circle diameter of the metal particles B is preferably in a range of 1 nm to 120 nm and more preferably in a range of 1 nm to 100 nm.

In the present disclosure, the "average equivalent circle diameter of the metal particles B" indicates the number average value of the equivalent circle diameters of 500 pieces of metal particles B.

The equivalent circle diameter of each metal particle B is acquired based on a transmission electron microscope image (TEM image). Specifically, the diameter of a circle having the same area as the area (that is, the projected area) of the metal particle B in a TEM image is set as the equivalent circle diameter.

The example of the method of measuring the average equivalent circle diameter of the metal particles B is as described in the examples below.

The coefficient of variation in the particle size distribution of the metal particles B is preferably 50% or less, more preferably 40% or less, and still more preferably 30% or less.

The "coefficient of variation in the particle size distribution of the metal particles B" indicate a value (%) obtained by dividing the standard deviation of the equivalent circle diameters (particle size distribution) of 500 pieces of metal particles B by the number average value (the average equivalent circle diameter) of the equivalent circle diameters of 500 pieces of metal particles B and multiplying the divided value by 100.

From the viewpoint of allowing the metal particles B to easily enter gaps between the tabular metal particles A which can be generated at the time of application of the metal dispersion liquid onto the base material by suppressing the volume of the metal particles B to be small, the average thickness of the metal particles B is preferably 50 nm or less, more preferably in a range of 1 nm to 50 nm, still more preferably in a range of 1 nm to 30 nm, and particularly preferably in a range of 1 nm to 15 nm.

In the present disclosure, the "average thickness of the metal particles B" indicates the number average value of the thicknesses of 500 pieces of the metal particles B.

The thickness of each metal particle B is measured according to a focused ion beam-transmission electron microscopy (FIB-TEM) method.

The example of the method of measuring the average thickness of the metal particles B is as described in the examples below.

The average aspect ratio (that is, average equivalent circle diameter/average thickness) of the metal particles B is in a range of 1 to 15.

In a case where the average aspect ratio of the metal particles B is in a range of 1 to 15, since aggregation of the tabular metal particles A can be suppressed, a metal dispersion liquid with excellent dispersion stability can be realized.

Further, in the case where the average aspect ratio of the metal particles B is 15 or less, the metal particles B enter gaps between the tabular metal particles A which can be generated at the time of application of the metal dispersion liquid onto the base material so that the gaps are filled. The glossiness of the film is increased in a case where the gaps between the tabular metal particles A are filled with the metal particles B, and thus a film having specular glossiness can be realized.

The average aspect ratio of the metal particles B is preferably 1 or greater and less than 8 and more preferably in a range of 1 to 6.

The metal element contained in the metal particles B is not particularly limited, and examples thereof include metal elements such as silver, gold, platinum, and aluminum.

From the viewpoint of the specular glossiness of a film (for example, an image), the metal particles B contain preferably at least one metal element selected from the group consisting of silver, gold, or platinum, more preferably at least one metal element selected from silver or gold, and still more preferably silver.

Further, from the viewpoint of suppressing the tint of a film (for example, an image), the metal particles B contain preferably at least one metal element selected from silver or platinum and more preferably silver.

For example, from the viewpoint of further improving the specular glossiness of a film (for example, an image), the content of the silver in the metal particles B is preferably 80% by mass or greater with respect to the total amount of the metal particles B.

The metal dispersion liquid according to the embodiment of the present disclosure may contain one or two or more kinds of metal particles B.

~Method of Synthesizing Metal Particles B~

A method of synthesizing the metal particles B is not particularly limited and can be appropriately selected depending on the purpose thereof.

Examples of the method of synthesizing the metal particles B in a case where the shape of the metal particles B is a spherical shape include liquid phase methods such as a chemical reduction method, a photochemical reduction method, and an electrochemical reduction method.

Among these, as the method of synthesizing the spherical metal particles B, from the viewpoint of controlling the shape, a chemical reduction method or a photochemical reduction method is preferable.

Examples of the method of synthesizing the metal particles B in a case where the shape of the metal particles B is a rod shape include liquid phase methods such as a chemical reduction method, a photochemical reduction method, and an electrochemical reduction method.

Among these, as the method of synthesizing the rod-like metal particles B, from the viewpoint of controlling the shape and the size, a chemical reduction method or a photochemical reduction method is preferable.

As the method of synthesizing the metal particles B in a case where the shape of the metal particles B is a tabular shape, the same method as the method of synthesizing the tabular metal particles A can be employed.

As the method of synthesizing the metal particles B, a method of fixing a seed crystal onto a surface of a transparent base material such as a film or glass in advance and then allowing crystals of the metal particles (for example, Ag) to grow in a desired shape (such as a spherical shape, a rod shape, or a tabular shape) may be used in addition to the synthesis method described above.

The metal particles B may be further subjected to another treatment in order to impart desired characteristics.

Since the treatment which may be further performed on the metal particles B is the same as the treatment which may be further performed on the tabular metal particles A, the description thereof will not be provided here.

—Difference Between Average Aspect Ratio of Tabular Metal Particles A and Average Aspect Ratio of Metal Particles B—

A difference between the average aspect ratio of the tabular metal particles A and the average aspect ratio of the metal particles B in the metal dispersion liquid according to the embodiment of the present disclosure is preferably 6 or greater, more preferably 10 or greater, still more preferably 15 or greater, and particularly preferably 20 or greater.

In a case where the difference between the average aspect ratio of the tabular metal particles A and the average aspect ratio of the metal particles B is 6 or greater, the dispersion stability of the metal dispersion liquid can be further improved. Further, in a case where the metal dispersion liquid is sued as an ink for ink jet recording, the jettability can be further improved.

The upper limit of the difference between the average aspect ratio of the tabular metal particles A and the average aspect ratio of the metal particles B is not particularly limited, but is preferably 50 or less.

—Relationship Between Average Equivalent Circle Diameter A1 of Tabular Metal Particles A and Average Equivalent Circle Diameter B1 of Metal Particles B—

The average equivalent circle diameter A1 of the tabular metal particles A and the average equivalent circle diameter B1 of the metal particles B satisfy Expression (1).

$$A1 > B1 \qquad \text{Expression (1)}$$

In the metal dispersion liquid according to the embodiment of the present disclosure, in a case where the average equivalent circle diameter A1 of the tabular metal particles A satisfying the above-described requirements and the average equivalent circle diameter B1 of the metal particles B satisfying the above-described requirements satisfy Expression (1), aggregation of the tabular metal particles A can be suppressed by the metal particles B, and thus a metal dispersion liquid with excellent dispersion stability can be realized.

Further, in the metal dispersion liquid according to the embodiment of the present disclosure, in the case where the average equivalent circle diameter A1 of the tabular metal particles A satisfying the above-described requirements and the average equivalent circle diameter B1 of the metal particles B satisfying the above-described requirements satisfy Expression (1), the metal particles B enter gaps between the tabular metal particles A which can be generated at the time of application of the metal dispersion liquid onto the base material so that the gaps are filled. The glossiness of the film is increased in a case where the gaps between the tabular metal particles A are filled with the metal particles B, and thus a film having specular glossiness can be realized.

—Relationship Between Content A of Tabular Metal Particles A and Content B of Metal Particles B—

In the metal dispersion liquid according to the embodiment of the present disclosure, the content a of the tabular metal particles A and the content b of the metal particles B with respect to the total mass of the metal dispersion liquid satisfy Expression (2).

$$0.0001 \leq b/(a+b) \leq 0.3 \qquad \text{Expression (2)}$$

In the metal dispersion liquid according to the embodiment of the present disclosure, in a case where the content a of the tabular metal particles A satisfying the above-described requirements and the content b of the metal particles B satisfying the above-described requirements with respect to the total mass of the metal dispersion liquid satisfy Expression (2), the dispersion stability of the metal dispersion liquid can be improved while the effect of the tabular metal particles A, that is, the effect of forming a film with specular glossiness and a suppressed tint is maintained. Further, in a case where the metal dispersion liquid is sued as an ink for ink jet recording, the jettability can be further improved.

It is preferable that the content a of the tabular metal particles A and the content b of the metal particles B with respect to the total mass of the metal dispersion liquid satisfy Expression (2-1) from the viewpoint of forming a film with a suppressed tint and more preferable that the content a of the tabular metal particles A and the content b of the metal particles B with respect to the total mass of the metal dispersion liquid satisfy Expression (2-2) from the viewpoint of forming a film with excellent specular glossiness and a suppressed tint.

$$0.0001 \leq b/(a+b) \leq 0.2 \qquad \text{Expression (2-1)}$$

$$0.0001 \leq b/(a+b) \leq 0.15 \qquad \text{Expression (2-2)}$$

In the metal dispersion liquid according to the embodiment of the present disclosure, the content a of the tabular metal particles A and the content b of the metal particles B with respect to the total mass of the metal dispersion liquid is measured according to the following method.

The total content of the metal contained in the metal dispersion liquid is acquired by inductively coupled plasma (ICP) emission spectrometry. Next, the average volumes of the tabular metal particles A and the metal particles B are respectively calculated based on the average thickness and the average equivalent circle diameter respectively obtained by observing 500 metal particles based on a TEM image. In addition, the abundance ratio between the tabular metal particles A and the metal particle B is acquired using 500 metal particles which have been optionally extracted from the same TEM image. The content ratio between the tabular metal particles A and the metal particles B in the metal dispersion liquid is calculated based on the integrated volume ratio (average volume×abundance ratio) between the tabular metal particles A and the metal particles B under the assumption that the density of the tabular metal particles A is the same as the density of the metal particles B. The content a (unit: % by mass) of the tabular metal particles and the content b (unit: % by mass) of the metal particles B is calculated based on the total content of the metal contained in the metal dispersion liquid and the content ratio between the tabular metal particles A and the metal particles B in the metal dispersion liquid, which have been acquired.

[Water]

The metal dispersion liquid according to the embodiment of the present disclosure contains water.

The metal dispersion liquid according to the embodiment of the present disclosure contains water, and thus the handleability becomes excellent. Further, a load on the environment is reduced compared to a case where the metal dispersion liquid contains an organic solvent in place of water.

The content of water in the metal dispersion liquid according to the embodiment of the present disclosure is not particularly limited.

From the viewpoints of improving the handleability of the metal dispersion liquid and reducing the environmental load, the content of water in the metal dispersion liquid according to the embodiment of the present disclosure is preferably 10% by mass or greater, more preferably 20% by mass or greater, and still more preferably 30% by mass or greater with respect to the total amount of the metal dispersion liquid.

Further, from the viewpoint of the jettability of the metal dispersion liquid in the case where the metal dispersion liquid is used as an ink for ink jet recording, the content of water in the metal dispersion liquid according to the embodiment of the present disclosure is preferably 90% by mass or less, more preferably 80% by mass or less, and still more preferably 75% by mass or less with respect to the total amount of the metal dispersion liquid.

[Dispersant]

It is preferable that the metal dispersion liquid according to the embodiment of the present disclosure contains a dispersant from the viewpoint of the dispersibility of the metal particles (that is, the tabular metal particles A and the metal particles B).

The dispersant is not particularly limited, but a water-soluble dispersant is preferable.

Further, the term "water-soluble" in the water-soluble dispersant indicates a property in which 5 g or greater (preferably 10 g or greater) of the dispersant is dissolved in 100 g of water at 25° C.

Examples of the dispersant include a resin such as polyvinyl acetal, polyvinyl alcohol (PVA), polyvinyl butyral, polyacrylate, polymethyl methacrylate, polycarbonate, polyvinyl chloride, (saturated) polyester, polyurethane, or polyethyleneimine, polysaccharides such as cellulose, gelatin, polyethylene glycol, and polyvinylpyrrolidone (PVP).

Among these, gelatin is particularly preferable as a dispersant.

In a case where the metal dispersion liquid according to the embodiment of the present disclosure contains gelatin, the dispersibility of the metal particles (that is, the tabular metal particles A and the metal particles B) can be remarkably improved. In a case where the dispersibility of the metal particles (particularly the tabular metal particles A) is improved, improvement of specular glossiness of an image to be formed can be expected. Further, improvement of the dispersibility of the metal particles (that is, the tabular metal particles A and the metal particles B) leads to improvement of the jettability of the metal dispersion liquid from a nozzle in an ink jet head in a case where the metal dispersion liquid is used for image recording according to an ink jet method.

Particularly in a case where the tabular metal particles A contain silver and gelatin is selected as a dispersant, since the tabular metal particles A can be satisfactorily dispersed in the metal dispersion liquid at a high concentration, the specular glossiness of the film can be further improved.

Examples of the gelatin include alkali-treated gelatin accompanied by a treatment using an alkali such as lime in the process of induction from collagen; acid-treated gelatin accompanied by a treatment using an acid such as hydrochloric acid; enzyme-treated gelatin accompanied by a treatment using an enzyme such as an hydrolytic enzyme; oxygen-treated gelatin; modified gelatin (such as phthalated gelatin, succinated gelatin, or trimellitic gelatin) modified by a reagent containing one group which is capable of reacting an amino group, an imino group, a hydroxy group, or a carboxy group serving as a functional group contained in a gelatin molecule with these functional groups; and gelatin which has been typically used in the related art described from the 6-th line of the column lower left in page 222 to the last line of the column upper left in page 225 of JP1987-215272A (JP-S62-215272A).

From the viewpoint of the dispersibility of the metal particles (particularly the tabular metal particles A), the weight-average molecular weight of the gelatin is preferably in a range of 5000 to 1000000, more preferably in a range of 10000 to 500000, and still more preferably in a range of 20000 to 200000.

In the present specification, the weight-average molecular weight indicates a value measured according to gel permeation chromatography (GPC).

The weight-average molecular weight is measured according to GPC using HLC-8020GPC (manufactured by Tosoh Corporation) as a measuring device, three columns of TSKgel (registered trademark), Super Multipore HZ-H (manufactured by Tosoh Corporation, 4.6 mmID×15 cm), and tetrahydrofuran (THF) as an eluent. Further, the weight-average molecular weight is measured according to GPC by setting the sample concentration to 0.45% by mass, the flow rate to 0.35 mL/min, the sample injection amount of 10 μL, and the measurement temperature of 40° C. using a differential refractive index (RI) detector. The calibration curve is prepared from eight "standard samples TSK standard, polystyrene" (manufactured by Tosoh Corporation): "F-40", "F-20", "F-4", "F-1", "A-5000", "A-2500", "A-1000", and "n-propylbenzene".

In a where the metal dispersion liquid according to the embodiment of the present disclosure contains an organic solvent, the metal dispersion liquid may contain only one or two or more kinds of organic solvents.

In a case where the metal dispersion liquid according to the embodiment of the present disclosure contains a dispersant, the content of the dispersant in the metal dispersion liquid is not particularly limited.

The content of the dispersant (preferably gelatin) in the metal dispersion liquid according to the embodiment of the present disclosure is preferably 0.005% by mass or greater, more preferably 0.01% by mass or greater, and still more preferably 0.02% by mass or greater with respect to the total amount of the metal dispersion liquid.

In a case where the content of the dispersant in the metal dispersion liquid according to the embodiment of the present disclosure is 0.005% by mass or greater with respect to the total amount of the metal dispersion liquid, the dispersability of the metal particles (that is, the tabular metal particles A and the metal particles B) can be further improved.

Further, the content of the dispersant in the metal dispersion liquid according to the embodiment of the present disclosure is 15% by mass or less, more preferably 10% by mass or less, and still more preferably 5% by mass or less with respect to the total amount of the metal particles.

In a case where the content of the dispersant (particularly gelatin) in the metal dispersion liquid is extremely high, the specular glossiness of the film to be formed is degraded in some cases. In a case where the content of the dispersant in the metal dispersion liquid is 15% by mass or less with respect to the total amount of the ink, the specular glossiness of the film to be formed is unlikely to be degraded.

In the case where the metal dispersion liquid according to the embodiment of the present disclosure contains a dispersant, the ratio of the content of the metal particles to the content of the dispersant (that is, the total content of the tabular metal particles A and the metal particles B) (hereinafter, also referred to as "the content of the metal particles/the content of the dispersant") is preferably in a range of 0.1 to 10000, preferably in a range of 0.5 to 500, and more preferably in a range of 1 to 100 in terms of the mass.

In a case where the ratio of the content of the metal particles to the content of the dispersant is in the above-described range, the dispersibility of the metal particles (particularly the tabular metal particles A) is further improved, and a film with excellent specular glossiness can be formed. Further, in a case where the ratio of the content of the metal particles to the content of the dispersant is in the above-described range, the tint of a film to be formed is satisfactorily suppressed.

[Organic Solvent]

The metal dispersion liquid according to the embodiment of the present disclosure contains an organic solvent.

For example, in a case where the metal dispersion liquid according to the embodiment of the present disclosure is used for image recording according to an ink jet method, it is preferable that the metal dispersion liquid contains an organic solvent from the viewpoint of the jettability.

The organic solvent is not particularly limited, but a water-soluble organic solvent is preferable.

Further, the term "water-soluble" in the water-soluble organic solvent indicates a property in which 5 g or greater (preferably 10 g or greater) of the organic solvent is dissolved in 100 g of water at 25° C.

The water-soluble organic solvent is not particularly limited.

Examples of the water-soluble organic solvent include polyhydric alcohols such as glycerin, 1,2,6-hexanetriol, trimethylolpropane, ethylene glycol, propylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2,4-pentanediol, 1,2-octanediol, 1,2-hexanediol, 1,2-pentanediol, and 4-methyl-1,2-pentanediol; alkyl alcohols having 1 to 4 carbon atoms such as ethanol, methanol, butanol, propanol, and isopropanol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxy butanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, tripropylene glycol monomethyl ether, dipropylene glycol mono-n-propyl ether, and dipropylene glycol mono-iso-propyl ether; and pyrrolidones such as 2-pyrrolidone and N-methyl-2-pyrrolidone.

The water-soluble organic solvent can be appropriately selected from, for example, the water-soluble organic solvents described in paragraphs [0176] to [0179] of JP2011-046872A and the water-soluble organic solvents described in paragraphs [0063] to [0074] of JP2013-018846A in addition to those described above.

Further, among the water-soluble organic solvents, polyhydric alcohols are useful as an anti-drying agent or a wetting agent.

Examples of the polyhydric alcohols serving as an anti-drying agent or a wetting agent include polyhydric alcohols described in paragraph [0117] of JP2011-042150A.

As the water-soluble organic solvent, an organic solvent (hereinafter, also referred to as a "specific organic solvent") having a boiling point of 150° C. or higher and a solubility parameter (hereinafter, also referred to as an "SP" value) of 24 MPa$^{1/2}$ or greater is preferable.

For example, in a case where the metal dispersion liquid according to the embodiment of the present disclosure is used for image recording according to an ink jet method, it is preferable that the boiling point of the water-soluble organic solvent contained in the ink is 150° C. or higher (in other words, the boiling point of the water-soluble organic solvent is higher than the boiling point of water) from the viewpoint that degradation of the jettability of the metal dispersion liquid due to volatilization of the solvent is further suppressed.

The boiling point of the water-soluble organic solvent is more preferably 170° C. or higher and still more preferably 180° C. or higher.

The upper limit of the boiling point of the water-soluble organic solvent is not particularly limited, but is preferably 300° C. or less from the viewpoint of the viscosity of the metal dispersion liquid.

The boiling point of the water-soluble organic solvent is a value measured using a boiling point measuring device (DosaTherm300, manufactured by Titan Technologies, Inc.).

In the present disclosure, the boiling point indicates a boiling point measured under the atmospheric pressure.

Further, it is preferable that the SP value of the water-soluble organic solvent is 24 MPa$^{1/2}$ or greater from the viewpoint that the aligning properties of the tabular metal particles A in the metal dispersion liquid applied onto the base material are improved so that the specular glossiness of the film to be formed is further improved.

The SP value of the water-soluble organic solvent is more preferably 25 MPa$^{1/2}$ or greater, still more preferably 26 MPa$^{1/2}$ or greater, and particularly preferably 27 MPa$^{1/2}$ or greater.

The upper limit of the SP value of the water-soluble organic solvent is not particularly limited, but is preferably 40 MPa$^{1/2}$ or less from the viewpoint of the viscosity of the metal dispersion liquid.

The solubility parameter (SP value) of the water-soluble organic solvent is a value [unit: MPa$^{1/2}$] acquired using an Okitsu method. The Okitsu method is a known method of calculating the SP value in the related art and is described in Journal of the Adhesion Society of Japan, Vol. 29, No. 6 (1993), p. 249 to 259.

Hereinafter, specific examples of the specific organic solvent will be described. Further, the numerical values in parentheses indicate boiling points (unit: ° C.) and SP values (unit: MPa$^{1/2}$) in order of the description.

Specific examples thereof include ethylene glycol (197° C., 29.9 MPa$^{1/2}$), diethylene glycol (244° C., 24.8 MPa$^{1/2}$), propylene glycol (188° C., 27.6 MPa$^{1/2}$), 1,4-butanediol (230° C., 30.7 MPa$^{1/2}$), 1,2-pentanediol (206° C., 28.6 MPa$^{1/2}$), 1,5-pentanediol (206° C., 29.0 MPa$^{1/2}$), 1,6-hexanediol (250° C., 27.7 MPa$^{1/2}$), glycerin (290° C., 33.8 MPa$^{1/2}$), formamide (210° C., 39.3 MPa$^{1/2}$), dimethylformamide (153° C., 30.6 MPa$^{1/2}$), triethanolamine (208° C. (20 hPa), 32.3 MPa$^{1/2}$), polyethylene glycol (250° C., 26.1 MPa$^{1/2}$), 1,2-hexanediol (223° C., 24.1 MPa$^{1/2}$), and dipropylene glycol (230° C., 27.1 MPa$^{1/2}$).

Among these, at least one selected from the group consisting of propylene glycol, glycerin, and ethylene glycol is preferable as the specific organic solvent. These specific organic solvents are preferable from the viewpoint of further improving the jettability of the metal dispersion liquid in a case where the metal dispersion liquid according to the embodiment of the present disclosure is used for image recording according to an ink jet method.

In a where the metal dispersion liquid according to the embodiment of the present disclosure contains an organic solvent, the metal dispersion liquid may contain only one or two or more kinds of organic solvents.

In the case where the metal dispersion liquid according to the embodiment of the present disclosure contains an organic solvent, the content of the organic solvent in the metal dispersion liquid is not particularly limited.

The content of the organic solvent (preferably the specific organic solvent) in the metal dispersion liquid according to the embodiment of the present disclosure is preferably in a range of 5% by mass to 80% by mass, more preferably in a range of 5% by mass to 70% by mass, still more preferably in a range of 5% by mass to 50% by mass, and particularly preferably in a range of 10% by mass to 40% by mass with respect to the total amount of the metal dispersion liquid.

[Surfactant]

The metal dispersion liquid according to the embodiment of the present disclosure may contain a surfactant.

In a case where the metal dispersion liquid according to the embodiment of the present disclosure contains a surfactant, a fluorine-based surfactant is preferable as the surfactant.

In a case where the metal dispersion liquid according to the embodiment of the present disclosure contains a fluorine-based surfactant, since the surface tension of the metal dispersion liquid is decreased, the aligning properties of the tabular metal particles A in the metal dispersion liquid which has been applied onto the base material can be improved. As the result, a film with excellent specular glossiness can be formed.

The fluorine-based surfactant is not particularly limited and can be selected from known fluorine-based surfactants.

Examples of the fluorine-based surfactant include fluorine-based surfactants described in "Surfactant Handbook" (edited by Ichiro Nishi, Ichiro Imai, and Masatachi Kasai, Sangyo Tosho Publishing Co., Ltd., 1960).

As the fluorine-based surfactant, a fluorine-based surfactant containing a perfluoro group in a molecule and having a refractive index of 1.30 to 1.42 (preferably in a range of 1.32 to 1.40) is preferable.

According to the fluorine-based surfactant having a refractive index of 1.30 to 1.42, the specular glossiness of the film to be formed can be further improved.

The refractive index of the fluorine-based surfactant is a value measured using a Kalnew precision refractometer (KPR-3000, manufactured by Shimadzu Corporation). In a case where the fluorine-based surfactant is a liquid, the refractive index is measured by storing the fluorine-based surfactant in a cell. In a case where the fluorine-based surfactant is a solid, the refractive index is measured using a V block method of placing the solid sample in a V block prism attached to a Kalnew precision refractometer (KPR-3000, manufactured by Shimadzu Corporation).

In a case where the fluorine-based surfactant contains a perfluoro group in a molecule, the refractive index of the fluorine-based surfactant is easily adjusted to be in the above-described range, and the surface tension of the metal dispersion liquid can be adjusted with a relatively small amount of the fluorine-based surfactant.

Examples of the fluorine-based surfactant containing a perfluoro group in a molecule and having a refractive index of 1.30 to 1.42 include an anionic surfactant such as perfluoroalkyl carbonate, perfluoroalkyl sulfonate, or perfluoroalkyl phosphoric acid ester; an amphoteric surfactant such as perfluoroalkyl betaine; a cationic surfactant such as perfluoroalkyltrimethylammonium salt; and a nonionic surfactant such as perfluoroalkylamine oxide, a perfluoroalkylethylene oxide adduct, an oligomer containing a perfluoroalkyl group and a hydrophilic group, an oligomer containing a perfluoroalkyl group and a lipophilic group, an oligomer containing a perfluoroalkyl group, a hydrophilic group, and a lipophilic group, or urethane containing a perfluoroalkyl group and a lipophilic group. Further, suitable examples thereof include fluorine-based surfactants described in JP1987-170950A (JP-S62-170950A), JP1987-226143A (JP-S62-226143A), and JP1985-168144A (JP-S60-168144A).

As the fluorine-based surfactant, a commercially available product may be used.

Examples of the commercially available product of the fluorine-based surfactant include SURFLON (registered trademark) Series (S-243, S-242, and the like, manufactured by AGC SEIMI CHEMICAL CO., LTD.), MEGAFACE (registered trademark) Series (F-444, F-410, and the like, manufactured by DIC Corporation), NOVEC (registered trademark) Series (for example, 27002, manufactured by 3M Japan Ltd.), and ZONYL Series (for example, FSE, manufactured by E. I. du Pont de Nemours and Company).

In a case where the metal dispersion liquid according to the embodiment of the present disclosure contains a surfactant, the metal dispersion liquid may contain only one or two or more kinds of surfactants.

In the case where the metal dispersion liquid according to the embodiment of the present disclosure contains a surfactant, the content of the surfactant in the metal dispersion liquid is not particularly limited.

The content of the surfactant (preferably the fluorine-based surfactant) in the metal dispersion liquid according to the embodiment of the present disclosure is preferably in a range of 0.01% by mass to 5.0% by mass, more preferably in a range of 0.03% by mass to 1.0% by mass, and still more preferably in a range of 0.03% by mass to 0.5% by mass with respect to the total amount of the metal dispersion liquid.

In a case where the content of the surfactant in the metal dispersion liquid according to the embodiment of the present disclosure is in the above-described range, the surface tension of the metal dispersion liquid is likely to be adjusted such that the jettability of the metal dispersion liquid is further improved in the case where the metal dispersion liquid is used as an ink for ink jet recording, that is, the metal dispersion liquid is used for image recording according to an ink jet method.

[Other Components]

The metal dispersion liquid composition according to the embodiment of the present disclosure may contain components other than the above-described component (so-called other components) as necessary.

Examples of other components include a preservative and an antifoaming agent.

The preservative can refer to the description in paragraphs [0073] to [0090] of JP2014-184688A.

The antifoaming agent can refer to the description in paragraphs [0091] and [0092] of JP2014-184688A.

Further, examples of other components include a solid wetting agent (for example, urea), an antifading agent, an emulsification stabilizer, a penetration enhancer, an ultraviolet absorbing agent, a fungicide, a pH adjuster, a viscosity adjuster, a rust inhibitor, and a chelating agent.

Further, as other components, polymer particles are also exemplified.

Examples of the polymer particles include self-dispersing polymer particles described in paragraphs [0090] to [0121] of JP2010-064480A, paragraphs [0130] to [0167] of JP2011-068085A, and paragraphs [0180] to [0234] of JP2011-062998A.

The metal dispersion liquid according to the embodiment of the present disclosure may contain a colorant (a pigment, a dye, or the like).

From the viewpoints of light fastness of a film (for example, an image) and the weather fastness of a film (for example, an image), a pigment is preferable as the colorant.

The pigment is not particularly limited and can be appropriately selected depending on the purpose thereof.

Examples of the pigment include known organic pigments and inorganic pigments.

Examples of the organic pigments and inorganic pigments include a yellow pigment, a red pigment, a magenta pigment, a blue pigment, a cyan pigment, a green pigment, an orange pigment, a purple pigment, a brown pigment, a black pigment, and a white pigment. Further, examples of the pigment include surface-treated pigments (for example, a pigment whose surface is treated with a dispersant such as a resin or a pigment derivative and a self-dispersing pigment having particles, each of which contains a hydrophilic group. In addition, as the pigment, a commercially available pigment dispersion may be used.

In a case where a pigment is used as the colorant, a pigment dispersant may be used as necessary.

The coloring material such as a pigment and the pigment dispersant can appropriately refer to the description in paragraphs [0180] to [0200] of JP2014-040529A.

Here, in a case where a metallic tone film (for example, an image) in which a tint is suppressed is formed (recorded or the like), the content of the colorant in the metal dispersion liquid according to the embodiment of the present disclosure is preferably 1% by mass or less, more preferably less than 1% by mass, still more preferably 0.1% by mass or less, and most preferably 0% by mass (that is, the metal dispersion liquid according to the embodiment of the present disclosure does not contain a colorant) with respect to the total amount of the metal dispersion liquid.

Further, the metal dispersion liquid according to the embodiment of the present disclosure may be used as a photocurable ink containing at least one polymerizable compound. In this case, it is preferable that the metal dispersion liquid further contains a polymerization initiator.

Examples of the polymerizable compound include the polymerizable compounds (such as a bi- or higher functional (meth)acrylamide compound) described in paragraphs to [0144] of JP2011-184628A, paragraphs [0019] to [0034] of JP2011-178896A, and paragraphs [0065] to [0086] of JP2015-025076A.

Examples of the polymerization initiator include known polymerization initiators described in paragraphs [0186] to [0190] of JP2011-184628A, paragraphs [0126] to [0130] of JP2011-178896A, and paragraphs [0041] to [0064] of JP2015-025076A.

<Preferable Physical Properties of Metal Dispersion Liquid>

The physical properties of the metal dispersion liquid according to the embodiment of the present disclosure are not particularly limited, but the following physical properties are preferable.

The pH of the metal dispersion liquid according to the embodiment of the present disclosure at 25° C. (±1° C.) is more preferably in 7.5 or greater, more preferably in a range of 7.5 to 12, and still more preferably in a range of 7.5 to 10.

The viscosity of the metal dispersion liquid according to the embodiment of the present disclosure is preferably in a range of 0.5 mPa·s to 100 mPa·s and more preferably in a range of 1 mPa·s to 50 mPa·s.

The viscosity of the metal dispersion liquid according to the embodiment of the present disclosure is measured using a VISCOMETER TV-22 (manufactured by TOKI SANGYO CO., LTD.) under a temperature condition of 30° C.

The surface tension of the metal dispersion liquid according to the embodiment of the present disclosure at 25° C. (±1° C.) is preferably 60 mN/m or less, more preferably in a range of 20 mN/m to 50 mN/m, and still more preferably in a range of 25 mN/m to 45 mN/m.

From the viewpoints of improving the wettability and suppressing occurrence of curling in the base material, it is advantageous that the surface tension of the metal dispersion liquid is 60 mN/m or less.

The surface tension of the metal dispersion liquid according to the embodiment of the present disclosure is measured using an Automatic Surface Tensiometer CBVP-Z (manufactured by Kyowa Interface Science, Inc.) according to a plate method.

<Applications of Metal Dispersion Liquid>

The metal dispersion liquid according to the embodiment of the present disclosure can be suitably used as a liquid for forming a film (for example, an image) on a base material (for example, a recording medium). Examples of such a liquid include a coating solution (for example, a coating liquid) for forming a coated film on a base material and an ink [for example, an ink used for a ballpoint pen (that is, an ink for a ballpoint pen) and an ink used for ink jet recording (that is, an ink for ink jet recording)] for forming an image on a base material as a recording medium.

Since the metal dispersion liquid according to the embodiment of the present disclosure has excellent dispersion stability, coating unevenness is unlikely to occur in a case where the metal dispersion liquid is used as a coating solution. Further, since the metal dispersion liquid according to the embodiment of the present disclosure has excellent dispersion stability, clogging of an ink is unlikely to occur in a case where the metal dispersion liquid is used as an ink for a ballpoint pen. Further, since the metal dispersion liquid according to the embodiment of the present disclosure has excellent dispersion stability, clogging of a nozzle in an ink jet head is unlikely to occur in a case where the metal dispersion liquid is used as an ink for ink jet recording.

Since the metal dispersion liquid according to the embodiment of the present disclosure can be used for forming a film (for example, an image) with specular glossiness and a suppressed tint, it is preferable that the metal dispersion liquid is used for recording a decorative image, particularly, a decorative image according to an ink jet method.

The "recording of a decorative image" indicates general recording of an image for the purpose of adding decoration to an object. The recording of a decorative image is different from the recording carried out for the purpose other than the above-described purpose (for example, recording for forming a conductive line).

In a case where the metal dispersion liquid according to the embodiment of the present disclosure is used for recording a decorative image, decoration with specular glossiness and a suppressed tint can be added to an object.

From the viewpoint of effectively obtaining the effect of specular glossiness, it is preferable that the metal dispersion liquid according to the embodiment of the present disclosure is used for recording an image having a minimum width of 1 mm or greater.

The minimum width of the image to be recorded with the metal dispersion liquid according to the embodiment of the present disclosure is more preferably 2 mm or greater and still more preferably 3 mm or greater.

The upper limit of the minimum width of the image to be recorded with the metal dispersion liquid according to the embodiment of the present disclosure is not particularly limited. For example, the upper limit thereof is 300 mm or less and preferably 200 mm or less.

<Method of Producing Metal Dispersion Liquid>

A method of producing the metal dispersion liquid according to the embodiment of the present disclosure is not particularly limited, and a method of mixing respective components described above is exemplified.

A preferable aspect (hereinafter, also referred to as a "first aspect") of the method of producing the metal dispersion liquid according to the embodiment of the present disclosure is an aspect of a method including a step (hereinafter, also referred to as a "preparation step A") of preparing a dispersion liquid containing the tabular metal particles (hereinafter, referred to as a "dispersion liquid A"); a step (hereinafter, also referred to as a "preparation step B") of preparing a dispersion liquid containing metal particles B (hereinafter, referred to as a "dispersion liquid B"); and a step (hereinafter, also referred to as a "mixing step X") of mixing the dispersion liquid A, the dispersion liquid B, and other components such as a dispersant, an organic solvent, and a surfactant as necessary.

According to the first aspect, in the mixing step X, the mixing ratio between the dispersion liquid A and the dispersion liquid B is adjusted by the content a of the tabular metal particles A and the content b of the metal particles B with respect to the total amount of the metal dispersion liquid such that Expression (2) is satisfied (preferably Expression (2-1) is satisfied and more preferably Expression (2-2) is satisfied).

Further, another preferable aspect (hereinafter, also referred to as a "second aspect") of the method of producing the metal dispersion liquid according to the embodiment of the present disclosure is an aspect of a method including a step (hereinafter, also referred to as a "preparation step C") of preparing a dispersion liquid containing the tabular metal particles A and the metal particles B (hereinafter, referred to as a "dispersion liquid C"); and a step (hereinafter, also referred to as a "mixing step Y") of mixing the dispersion liquid C and other components such as a dispersant, an organic solvent, and a surfactant as necessary.

According to the second aspect, the dispersion liquid C obtained by adjusting the content ratio between the tabular metal particles A and the metal particles B in advance is prepared in the preparation step C such that a metal dispersion liquid finally satisfying Expression (2) (preferably Expression (2-1) is satisfied and more preferably Expression (2-2) is satisfied) is obtained.

The method of producing the dispersion liquid C is not particularly limited, and examples thereof include liquid phase methods such as a chemical reduction method, a photochemical reduction method, and an electrochemical reduction method.

The shape and the size (the so-called equivalent circle diameter and thickness) of the metal particles contained in the dispersion liquid C can be adjusted by the synthesis technique (for example, adjustment of the addition amount of a reagent to be used for synthesis or the timing for addition) used at the time of synthesis of the metal particles.

Further, the content ratio between the tabular metal particles A and the metal particles B contained in the dispersion liquid C can be adjusted by post-treatments (centrifugation, ultrafiltration, or the like) after the synthesis of the metal particles. The method for the post-treatments can refer to the description of paragraphs [0060] to [0062] in JP2014-070246A can be referred to.

<Ink Set>

The metal dispersion liquid according to the embodiment of the present disclosure can be suitably used as an ink constituting an ink set.

The ink set in a case where the metal dispersion liquid according to the embodiment of the present disclosure is used as an ink is not particularly limited, but an ink set according to the present embodiment described below is preferable.

The ink set according to the present disclosure includes a first ink which is the above-described metal dispersion liquid according to the embodiment of the present disclosure and a second ink which contains a colorant and is different from the first ink.

The ink set according to the embodiment of the present disclosure is an ink set which is capable of recording an image formed by combining an image having specular glossiness (a so-called specular image) and a colored image that does not have specular glossiness.

According to an aspect of a preferable use for the ink set according to the present embodiment, an image (that is, a specular image) formed of the first ink and a colored image formed of the second ink are formed on the base material in parallel with each other or in an overlapping manner.

In a case where the specular image formed of the first ink and the colored image formed of the second ink are formed in an overlapping manner, any of the specular image formed of the first ink or the colored image formed of the second ink may be used as an underlayer (that is, a layer on a side close to the base material).

In a case where the specular image formed of the first ink is used as an underlayer (that is, a layer on a side close to the base material) and the colored image formed of the second ink is used as an upper layer (that is, a layer on a side far from the base material), a colored image having specular glossiness is obtained in a portion where the specular image formed of the first ink and the colored image formed of the second ink overlap with each other.

In a case where the colored image formed of the second ink is used as an underlayer (that is, a layer on a side close to the base material) and the specular image formed of the first ink is used as an upper layer (that is, a layer on a side far from the base material), the colored image formed of the second ink can be hidden by the image (for example, a silver image) formed of the first ink in a portion where the specular image formed of the first ink and the colored image formed of the second ink overlap with each other.

Since the details of the first ink are the same as described in the section of the metal dispersion liquid, the description thereof will not be provided here.

The second ink is not particularly limited as long as the ink contains a colorant and can be appropriately selected from known inks.

It is preferable that the second ink contains an achromatic ink containing a black or white colorant or at least one selected from chromatic inks containing R (so-called red), G (so-called green), B (so-called blue), Y (so-called yellow), M (so-called magenta), and C (so-called cyan) colorants.

The second ink may be an aqueous ink containing water as a main vehicle or a solvent-based ink containing a solvent as a main vehicle.

Further, the second ink may be a photocurable ink containing a polymerizable compound and a photopolymerization initiator.

Examples of the colorant include colorants such as pigments and dyes.

Among these, from the viewpoints of light fastness of an image and the weather fastness of an image, a pigment is preferable as the colorant.

The pigment is not particularly limited and can be appropriately selected depending on the purpose thereof.

Examples of the pigment include known organic pigments and inorganic pigments.

Examples of the organic pigments and inorganic pigments include a yellow pigment, a red pigment, a magenta pigment, a blue pigment, a cyan pigment, a green pigment, an orange pigment, a purple pigment, a brown pigment, a black pigment, and a white pigment.

Further, examples of the pigment include surface-treated pigments (for example, a pigment whose surface is treated with a dispersant such as a resin or a pigment derivative and a self-dispersing pigment having particles, each of which contains a hydrophilic group. In addition, as the pigment, a commercially available pigment dispersion may be used.

In a case where a pigment is used as the colorant, a pigment dispersant may be used as necessary.

The coloring material such as a pigment and the pigment dispersant can appropriately refer to the description in paragraphs [0180] to [0200] of JP2014-040529A.

The second ink may contain only one or two or more kinds of colorants.

From the viewpoint of the density of the image, the content of the colorant (preferably a pigment) in the second ink is preferably 1% by mass or greater, more preferably in a range of 1% by mass to 20% by mass, and still more preferably in a range of 2% by mass to 10% by mass with respect to the total amount of the second ink.

In the ink set according to the present embodiment, it is preferable that the content of the colorant in the first ink is less than 1% by mass (more preferably 0.1% by mass or less) with respect to the total amount of the first ink and the content of the colorant in the second ink is 1% by mass or greater (more preferably in a range of 1% by mass to 20% by mass and still more preferably in a range of 2% by mass to 10% by mass) with respect to the total amount of the second ink.

[Image Recording Method]

The metal dispersion liquid according to the embodiment of the present disclosure can be used for recording an image.

The image recording method that uses the metal dispersion liquid according to the embodiment of the present disclosure is not particularly limited, but the following image recording method (hereinafter, also referred to as an "image recording method according to a first embodiment") according to the present embodiment is preferable.

The image recording method according to the first embodiment of the present disclosure includes a step (hereinafter, also referred to as an "application step") of applying the metal dispersion liquid according to the embodiment of the present disclosure onto the base material according to an ink jet method.

In the image recording method according to the first embodiment of the present disclosure, the metal dispersion liquid according to the embodiment of the present disclosure is used as an ink for ink jet recording. Since the metal dispersion liquid according to the embodiment of the present disclosure has excellent dispersion stability, clogging of a nozzle in an ink jet head due to the ink for ink jet recording is further suppressed in a case of using the image recording method according to the first embodiment of the present disclosure, and thus the jettability is improved. Further, according to the image recording method according to the first embodiment of the present disclosure, an image having specular glossiness and a suppressed tint can be recorded.

As the base material, a paper base material, a resin base material, or the like can be used without particular limitation.

Examples of the paper base material include plain paper, glossy paper, and coated paper.

The glossy paper is a paper base material comprising base paper and polymer fine particles or porous fine particles disposed on the base paper.

The glossy paper are not particularly limited. Examples of the commercially available products of the glossy paper include "KASSAI (registered trademark)" (manufactured by Fujifilm corporation), photo paper and photo glossy paper (manufactured by Seiko Epson Corporation), and glossy paper (manufactured by Konica Minolta, Inc.).

Coated paper is a paper base material comprising base paper and a coating layer disposed on the base paper.

The coated paper is not particularly limited. Examples of the commercially available products of the coated paper include "OK TOP COAT (registered trademark)+" (manufactured by Oji Paper Co., Ltd.), and "AURORA COAT" (manufactured by Nippon Paper Industries Co., Ltd.).

From the viewpoint that an image with excellent specular glossiness can be recorded, as the paper base material, glossy paper or coated paper is preferable, and glossy paper is more preferable.

Examples of the resin base material include a resin film.

Examples of the resin film include polyvinyl chloride (PVC), cellulose diacetate, cellulose triacetate, cellulose propionate, cellulose butyrate, cellulose acetate butyrate, cellulose nitrate, polyethylene terephthalate (PET), polyethylene naphthalate, polyethylene, polystyrene, polypropylene, polycarbonate, polyvinyl acetate, and an acrylic resin.

Among these, from the viewpoint that an image with excellent specular glossiness can be recorded, as the resin film, a PVC film or a PET film is preferable, and a PET film is more preferable.

The above-described base material may include an ink image-receiving layer provided for the purpose of improving the fixing property of the ink and the image quality as necessary.

Further, the base material may be a base material on which an image has already been recorded. In other words, the image recording method according to the first embodiment may be a method of recording an image using the metal dispersion liquid according to the embodiment of the present disclosure on the image (a so-called recorded image) of the base material, on which an image has already been recorded.

By recording an image using the metal dispersion liquid according to the embodiment of the present disclosure on the image which has already been recorded on the base material, decoration with specular glossiness can be added to the image which has already been recorded on the base material. Further, the image which has already been recorded on the base material can be hidden by an image (for example, a silver image) to be recorded using the metal dispersion liquid according to the embodiment of the present disclosure.

The system of the ink jet method is not particularly limited and can be appropriately selected from known systems.

Examples of the system of the ink jet method include an electric charge control system of jetting an ink using electrostatic attraction; a drop-on-demand system (pressure pulse system) of using the vibration pressure of a piezoelectric element; an acoustic ink jet system of converting an electric signal to an acoustic beam, irradiating an ink with the acoustic beam, and jetting the ink using a radiation pressure; and a thermal ink jet (Bubble Jet (registered trademark)) system of forming bubbles by heating an ink to use the generated pressure.

The ink jet head system may be an on-demand system or a continuous system.

The system of jetting the ink from the ink jet head is not particularly limited.

Examples of the ink jetting system include an electromechanical conversion system (a single cavity type, a double cavity type, a vendor type, a piston type, a share mode type, a shared wall type, or the like); an electricity-heat conversion system (a thermal ink jet type, a Bubble Jet (registered trademark) type, or the like); an electrostatic attraction system (an electric field control type, a silt jet type, or the like); and a discharge system (a spark jet type).

Examples of the recording system in the ink jet method include a shuttle system of performing recording while scanning the head in a width direction of the base material using a single serial head; and a line system (single pass system) of using a line head in which recording elements are arranged over the entire area on one side of the base material.

From the viewpoint that an image with high resolution can be recorded, the nozzle diameter of the jet head is not particularly limited, but is preferably less than 25 µm, more preferably 5 µm or greater and less than 25 µm, still more preferably 10 µm or greater and less than 25 µm, and particularly preferably 15 µm or greater and less than 25 µm.

The image recording method according to the first embodiment of the present disclosure may include a step of drying the metal dispersion liquid applied onto the base material.

The drying may be natural drying at room temperature or heat drying.

In a case where a resin base material is used as the base material, heat drying is preferable.

The means for heat drying is not particularly limited, and examples thereof include a heat drum, warm air, an infrared lamp, and a heat oven.

The temperature for heat drying is preferably 50° C. or higher, more preferably in a range of 60° C. to 150° C., and still more preferably in a range of 70° C. to 100° C.

The time for heat drying can be appropriately set in consideration of the composition of the metal dispersion liquid and the amount of the metal dispersion liquid to be jetted and is preferably in a range of 1 minute to 180 minutes, more preferably in a range of 5 minutes to 120 minutes, and still more preferably in a range of 5 minutes to 60 minutes.

Examples of the image recording method that uses the metal dispersion liquid according to the embodiment of the present disclosure include the following image recording method according to a second embodiment of the present disclosure in addition to the image recording method according to the first embodiment of the present disclosure described above. In the image recording method according to the second embodiment of the present disclosure, the ink set according to the present embodiment described above is used.

The image recording method according to the second embodiment of the present disclosure includes a step of applying the first ink (hereinafter, also referred to as a "first ink application step") which is the metal dispersion liquid according to the embodiment of the present disclosure to the base material using an ink jet method and a step of applying the second ink (hereinafter, also referred to as a "second ink application step") which contains a colorant and is different from the first ink to the base material.

Any of the first ink application step or the second ink application step may be performed first.

The image recording method according to the second embodiment of the present disclosure may include a step of drying the ink (that is, at least one of the first ink or the second ink) applied to the base material at the time of at least one of between the first ink application step and the second ink application step or after the step performed later between the first ink application step and the second ink application step. Since the details of the step of drying the ink (that is, at least one of the first ink or the second ink) are the same as the step of drying the metal dispersion liquid in the image recording method according to the first embodiment of the present disclosure, the description thereof will not be provided here.

A preferable aspect of the image recording method according to the second embodiment of the present disclosure is an aspect in which the second ink application step is performed after the first ink application step, specifically, an aspect in which the method includes a step of applying the first ink (that is, the "first ink application step") to the base material using an ink jet method and a step of applying the second ink (that is, the "second ink application step") on the first ink of the base material to which the first ink has been applied.

According to this aspect, a colored image having specular glossiness can be formed in a portion where a specular image formed of the first ink and a colored ink formed of the second ink overlap with each other.

Another preferable aspect of the image recording method according to the second embodiment of the present disclosure is an aspect in which the second ink application step is performed after the first ink application step, specifically, an aspect in which the method includes a step of applying the second ink (that is, the "second ink application step") to the base material using an ink jet method and a step of applying the first ink (that is, the "first ink application step") on the second ink of the base material to which the second ink has been applied according to an ink jet method.

According to this aspect, a colored image formed of the second ink can be hidden by an image formed of the first ink (for example, a silver image).

A preferable aspect of the first ink application step is the same as the application step in the above-described image recording method according to the first embodiment of the present disclosure.

The method of applying the second ink in the second ink application step is not particularly limited, and a method of applying an ink to a base material in a known image recording method can be employed.

The second ink application step may be performed under the same conditions as those for the first ink application step or performed under the conditions different from those for the first ink application step.

[Recorded Object]

The metal dispersion liquid according to the embodiment of the present disclosure can be used for preparation of a recorded object.

According to the metal dispersion liquid according to the embodiment of the present disclosure, a recorded object comprising an image with specular glossiness and a suppressed tint can be prepared.

Further, since the metal dispersion liquid according to the embodiment of the present disclosure has excellent dispersion stability, occurrence of unevenness in the image comprised in the recorded object is suppressed.

As the recorded object prepared using the metal dispersion liquid according to the embodiment of the present disclosure, the following recorded object according to the present embodiment is exemplified.

The recorded object of the present embodiment comprises a base material, tabular metal particles A which are disposed on the base material and have an average aspect ratio of greater than 20 and an average equivalent circle diameter of 50 nm to 1000 nm, metal particles B which have an average aspect ratio of 1 to 15 and an average equivalent circle diameter of 1 nm to 150 nm, and an image in which the average equivalent circle diameter A1 of the tabular metal particles A and the average equivalent circle diameter B1 of the metal particles B satisfy Expression (1) and a content ax of the tabular metal particles A and a content bx of the metal particles B with respect to the total mass of components contained in the image satisfy Expression (2x).

$A1 > B1$ Expression (1)

$0.0001 \leq bx/(ax+bx) \leq 0.3$ Expression (2x)

The aspect of the base material in the recorded object according to the embodiment of the present disclosure is the same as the preferable aspect of the base material used in the image recording method according to the present embodiment of the present disclosure.

The preferable aspect of the tabular metal particles A in the recorded object according to the present embodiment is the same as the preferable aspect of the tabular metal particles A in the metal dispersion liquid according to the embodiment of the present disclosure.

The preferable aspect of the metal particles B in the recorded object according to the present embodiment is the same as the preferable aspect of the metal particles B in the metal dispersion liquid according to the embodiment of the present disclosure.

The preferable aspect (for example, the minimum width of the image) of the image in the recorded object according to the present embodiment is the same as the preferable aspect of the image described in the section of the "applications of metal dispersion liquid".

The image in the recorded object according to the present embodiment may contain components (preferably components other than water and an organic solvent) exemplified as the components of the metal dispersion liquid according to the embodiment of the present disclosure.

The recorded material according to the present embodiment may comprise an image containing a colorant (that is, a colored image) on at least one of the image containing the tabular metal particles A and the metal particles B or a space between the base material and the image containing the tabular metal particles A and the metal particles B.

In a case where the recorded material according to the present embodiment comprises the colored image on the image containing the tabular metal particles A and the metal particles B, a colored image having specular glossiness is provided in a portion where the image containing the tabular metal particles A and the metal particles B and the colored image overlap with each other.

Further, in a case where the recorded material according to the present embodiment comprises the colored image between the base material and the image containing the tabular metal particles A and the metal particles B, the colored image is hidden by the image containing the tabular metal particles A and the metal particles B (for example, a silver image) in a portion where the image containing the tabular metal particles A and the metal particles B and the colored image overlap with each other.

The recorded image comprising an image that contains the tabular metal particles A and the metal particles B and a colored image can be prepared using the metal dispersion liquid according to the embodiment of the present disclosure and a known ink containing a colorant.

EXAMPLES

Hereinafter, the present invention will be described in more detail based on the following examples. However, the present invention is not limited to the following examples unless the gist thereof is overstepped.

In the following examples (here, Comparative Example 9A and Comparative Example 9B are excluded), in a case where the metal dispersion liquid contains two kinds of metal particles, the metal particles having a larger average equivalent circle diameter between two kinds of metal particles are referred to as "first metal particles" and the metal particles having a smaller average equivalent circle diameter are referred to as "second metal particles". Further, in a case where the metal dispersion liquid contains one kind of metal particles, the metal particles are referred to as "first metal particles".

[Preparation of Metal Dispersion Liquid]

Example 1A

—Preparation of Metal Particle-Forming Liquid—

A reaction container made of high Cr—Ni—Mo stainless steel (NTKR-4, manufactured by Nippon Metal Industry Co., Ltd.) was prepared. This reaction container comprises an agitator formed by attaching four propellers made of NTKR-4 and four paddles made of NTKR-4 to a shaft made of stainless steel (SUS316L).

While 13 liters (L) of ion exchange water was added to the reaction container and stirred using the agitator, 10 g/L of a 1.0 L trisodium citrate (anhydride) aqueous solution was added thereto. The temperature of the obtained liquid was maintained to 35° C.

8.0 g/L of a 0.68 L polystyrene sulfonic acid aqueous solution was added to the liquid whose temperature was maintained to 35° C., and 0.041 L of a sodium borohydride aqueous solution in which the concentration of the sodium borohydride was adjusted to 23 g/L was further added thereto. The concentration of the sodium borohydride aqueous solution was adjusted using 0.04 N (mol/L) of a sodium hydroxide (NaOH) aqueous solution.

0.10 g/L of a 13 L silver nitrate aqueous solution was further added to the liquid, to which the sodium borohydride aqueous solution had been added, at a rate of 5.0 L/min.

10 g/L of a 2.0 L trisodium citrate (anhydride) aqueous solution and 11 L of ion exchange water were further added to the obtained liquid, and 80 g/L of a 0.68 L potassium hydroquinone sulfonate aqueous solution was further added thereto.

Next, the rate of the stirring was increased to 800 rpm (revolutions per minute; the same applies hereinafter), 0.10 g/L of a 8.1 L silver nitrate aqueous solution was added to the solution at a rate of 0.95 L/min, and the temperature of the obtained liquid was decreased to 30° C.

Next, 44 g/L of an 8.0 L methyl hydroquinone aqueous solution was added to the resulting liquid cooled to 30° C., and the total amount of the gelatin aqueous solution at 40° C. described below was added thereto.

Thereafter, the rate of the stirring was increased to 1200 rpm, the total amount of the silver sulfite white precipitate mixed solution described below was added thereto.

The pH of the liquid to which the silver sulfite white precipitate mixed solution had been added was gradually changed. At the time at which the change in pH of the liquid was stopped, 1 N (mol/L) of a 5.0 L NaOH aqueous solution was added to the resulting liquid at a rate of 0.33 L/min. The pH of the obtained liquid was adjusted to 7.0 ±1.0 using NaOH and citric acid (anhydride). Next, 2.0 g/L of a 0.18 L sodium 1-(m-sulfophenyl)-5-mercaptotetrazole aqueous solution was added to the liquid after the adjustment of the pH thereof, and 70 g/L of a 0.078 L 1,2-benzisothiazolin-3-one aqueous solution which was dissolved by being adjusted to be alkaline was added thereto.

In the manner described above, a metal particle-forming liquid was obtained.

The metal particle-forming liquid was liquid-separated and accommodated in 20 L of a Union Container II type container (a low-density polyethylene container, manufactured by AS ONE Corporation) and stored at 30° C.

Further, the physical characteristics of the metal particle-forming liquid were as follows.

(Physical Characteristics of Metal Particle-Forming Liquid)

pH: 9.4 (a value measured by adjusting the liquid temperature of the metal particle-forming liquid to 25° C. using KR5E (manufactured by AS ONE Corporation))

Electrical conductivity: 8.1 mS/cm (a value measured using CM-25R (manufactured by DKK-TOA Corporation))

Viscosity: 2.1 mPa·s (a value measured by adjusting the liquid temperature of the metal particle-forming liquid to 25° C. using SV-10 (manufactured by A & D Co., Ltd.))

<<Preparation of Gelatin Aqueous Solution>>

A dissolution tank made of SUS316L comprising an agitator made of SUS316L was prepared.

16.7 L of ion exchange water was poured into this dissolution tank, and 1.4 kg of alkali-treated bovine bone gelatin (weight-average molecular weight: 200000, value measured by GPC) which had been subjected to a deionization treatment was added to the dissolution tank while the ion exchange water was stirred using the agitator at a low speed.

0.91 kg of alkali-treated bovine bone gelatin (weight-average molecular weight: 21000, value measured by GPC) which had been subjected to a deionization treatment, a proteolytic enzyme treatment, and an oxidation treatment with hydrogen peroxide was further added to the obtained liquid.

Thereafter, the temperature of the liquid was increased to 40° C., and the gelatin was allowed to be completely dissolved therein by simultaneously performing swelling and dissolving of the gelatin.

In this manner, a gelatin aqueous solution was prepared.

<<Preparation of Silver Sulfite White Precipitate Mixed Solution>>

A dissolution tank made of SUS316L comprising an agitator made of SUS316L was prepared.

8.2 L of ion exchange water was poured into this dissolution tank, and 100 g/L of an 8.2 L silver nitrate aqueous solution was added thereto.

While the obtained liquid was stirred using the agitator at a high speed, 140 g/L of a 2.7 L sodium sulfite aqueous solution was added thereto in a short time, thereby preparing a mixed solution containing a white precipitate of silver sulfite (that is, a silver sulfite white precipitate mixed solution).

This silver sulfite white precipitate mixed solution was prepared immediately before use.

—Preparation of Metal Dispersion Liquid (Desalting Treatment and Re-Dispersing Treatment)—

The metal particle-forming liquid was subjected to a desalting treatment and a re-dispersing treatment, thereby obtaining a metal dispersion liquid. The detailed operation is as follows.

800 g of the metal particle-forming liquid prepared in the above-described manner was collected in a centrifuge tube, a centrifugation operation was performed thereon using a centrifuge (himacCR22GIII, angle rotor: R9A, manufactured by Hitachi Koki Co., Ltd.) under conditions of 35° C. at 9000 rpm for 60 minutes, and 784 g of the supernatant liquid was disposed of. 0.2 mmol/L of a NaOH aqueous solution was added to the remaining solid (in other words, a solid containing metal particles and gelatin) such that the total amount thereof was set to 40 g, and the solution was stirred by hand using a stirring rod, thereby obtaining a crude dispersion liquid X.

By performing the same operation as described above, 120 crude dispersion liquids X were prepared. All of these prepared crude dispersion liquids X (in other words, 4800 g in total) were added to a tank made of SUS316L and mixed. Next, 10 mL of a 10 g/L solution (as the solvent, a mixed solution of methanol and ion exchange water at a volume ratio of 1:1 was used) of Pluronic 31R1 (nonionic surfactant, manufactured by BASF SE) was further added thereto.

Next, a batch type dispersing treatment was performed on the mixture of the crude dispersion liquids X in the tank at 9000 rpm for 120 minutes using an automixer 20 type (manufactured by PRIMIX Corporation) (a homomixer MARKII as a stirring unit). The liquid temperature during the dispersing treatment was maintained at 50° C.

After the dispersing treatment, the liquid temperature of the solution was decreased to 25° C., and single pass filtration was performed using a Profile II filter (MCY1001Y030H13, manufactured by Pall Corporation).

In the above-described manner, a metal dispersion liquid of Example 1A was prepared.

The metal dispersion liquid of Example 1A was accommodated in 20 L of a Union Container II type container (a low-density polyethylene container, manufactured by AS ONE Corporation) and stored at 30° C.

The content of the metal particles in the metal dispersion liquid of Example 1A was 15% by mass with respect to the total amount of the metal dispersion liquid. Further, the content of gelatin (dispersant) in the metal dispersion liquid of Example 1A was 0.75% by mass with respect to the total amount of the metal dispersion liquid.

Further, the physical characteristics of the metal dispersion liquid of Example 1A were as follows.

(Physical Characteristics of Metal Dispersion Liquid)

pH: 7.0 (a value measured by adjusting the liquid temperature of the metal particle-forming liquid to 25° C. using KRSE (manufactured by AS ONE Corporation))

Electrical conductivity: 0.08 mS/cm (a value measured using CM-25R (manufactured by DKK-TOA Corporation))

Viscosity: 7.4 mPa·s (a value measured by adjusting the liquid temperature of the metal particle-forming liquid to 25° C. using SV-10 (manufactured by A & D Co., Ltd.))

(Shape of Metal Particles)

After the metal dispersion liquid was diluted, the liquid was added dropwise onto a grid mesh for an optical microscope and dried, thereby preparing a sample for observation. The shape of the metal particles contained in the metal dispersion liquid was confirmed by observing the prepared sample for observation using a transmission electron microscope (TEM). As the result, the metal dispersion liquid contained tabular metal particles and spherical metal particles.

(Average Equivalent Circle Diameter of Metal Particles)

—Average Equivalent Circle Diameter of Tabular Metal Particles—

TEM images of the sample for observation obtained by performing observation using a transmission electron microscope (TEM) were taken in image treatment software ImageJ (provided by National Institutes of Health (NIH)) to carry out an image treatment.

More specifically, image analysis was performed on 500 pieces of tabular metal particles optionally extracted from the TEM images with several visual fields, and the diameters of equivalent circles having the same area were calculated. The average equivalent circle diameter of the tabular metal particles was acquired by simply averaging (that is, the number average) the diameters of the equivalent circles having the same area of the obtained 500 pieces of metal particles. The results are listed in Table 1.

—Average Equivalent Circle Diameter of Circular Metal Particles—

The average equivalent circle diameter of the circular metal particles was acquired according to the same method as the method for the average equivalent circle diameter of the tabular metal particles. In other words, image analysis was performed on 500 pieces of circular metal particles optionally extracted from the TEM images with several visual fields, and the diameters of equivalent circles having the same area were calculated. The average equivalent circle diameter of the circular metal particles was acquired by simply averaging (that is, the number average) the diameters of the equivalent circles having the same area of the obtained 500 pieces of circular metal particles. The results are listed in Table 1.

(Average Thickness of Metal Particles)

—Average Thickness of Tabular Metal Particles—

The metal dispersion liquid was added dropwise onto a silicon substrate and dried to obtain a sample for observing the average thickness. Using the prepared sample for observing the average thickness, the thicknesses of 500 pieces of tabular metal particles contained in the metal dispersion liquid were respectively measured according to a focused ion beam-transmission electron microscopy (FIB-TEM) method. The average thickness of the tabular metal particles was acquired by simply averaging (number average) the thicknesses of 500 pieces of the tabular metal particles. The results are listed in Table 1.

Average Thickness of Metal Particles

The average thickness of the circular metal particles was acquired according to the same method as the method for the average thickness of the tabular metal particles. In other words, using the prepared sample for observing the average thickness, the thicknesses of 500 pieces of circular metal particles contained in the metal dispersion liquid were respectively measured according to a focused ion beam-transmission electron microscopy (FIB-TEM) method. The results are listed in Table 1.

(Average Aspect Ratio of Metal Particles)

The average aspect ratio of the metal particles was acquired by dividing the average equivalent circle diameter of the metal particles by the average thickness of the metal particles. The results are listed in Table 1.

(Content of Metal Particles)

The content (unit: % by mass) of the first metal particles in the metal dispersion liquid and the content (unit: % by mass) of the second metal particles in the dispersion liquid was measured according to the following method.

The total content of the metal contained in the metal dispersion liquid was acquired by inductively coupled plasma (ICP) emission spectrometry.

Next, the average volumes of the first metal particles (tabular metal particles in Example 1A) and the second metal particles (circular metal particles in Example 1A) were respectively calculated based on the average thickness and the average equivalent circle diameter respectively obtained in the above-described manner. Next, the average volumes of the first metal particles A and the second metal particles B were respectively calculated based on the average thicknesses and the average equivalent circle diameters obtained by observing 500 metal particles using TEM images. In addition, the content ratio between the first metal particles and the second metal particles in the metal dispersion liquid was calculated based on the integrated volume ratio (average volume x abundance ratio) between the first metal particles and the second metal particles under the assumption that the density of the first metal particles was the same as the density of the second metal particles. The contents (unit: % by mass) of the first metal particles and the second metal particles were calculated based on the total content of the metal acquired in the above-described manner and the content ratio between the first metal particles and the second metal particles.

Examples 2A to 5A

Each metal dispersion liquid of Examples 2A to 5A was prepared in the same manner as in Example 1A except that the disposal amount of the supernatant after the centrifugal operation was performed was adjusted during the "—preparation of metal dispersion liquid (desalting treatment and re-dispersing treatment)—" and the ratio (content of second metal particles/total content of first metal particles and second metal particles) of the content of the second metal particles to the total content of the first metal particles and the second metal particles in the metal dispersion liquid in Example 1A was changed to the value listed in Table 1.

Example 6A

A metal dispersion liquid of Example 6A was prepared in the same manner as in Example 1A except that the timing of addition of "5.0 L of a 1N (mol/L) sodium hydroxide (NaOH) aqueous solution" during the "—preparation of metal particle-forming liquid—"was quickened, the disposal amount of the supernatant after the centrifugal operation was performed was adjusted during the "—preparation of metal dispersion liquid (desalting treatment and re-dispersing treatment)—", and the ratio (content of second metal particles/total content of first metal particles and second metal particles) of the content of the second metal particles to the total content of the first metal particles and the second metal particles in the metal dispersion liquid in Example 1A was changed to the value listed in Table 1.

Examples 7A and 8A

A metal dispersion liquid (first metal particle dispersion liquid) containing only the first metal particles listed in Table 1 as the metal particles was prepared in the same manner as in Example 1A except that the entire supernatant after the centrifugal operation was performed was disposed of during the "—preparation of metal dispersion liquid (desalting treatment and re-dispersing treatment)—" in Example 1A. Further, a metal dispersion liquid (second metal particle dispersion liquid) containing only the second metal particles listed in Table 1 as the metal particles was prepared in the same manner as in Example 1A except that the timing of addition of "5.0 L of a 1N (mol/L) sodium hydroxide (NaOH) aqueous solution" was quickened during the "—preparation of metal particle-forming liquid—" and the entire supernatant after the centrifugal operation was performed was disposed of during the "—preparation of metal dispersion liquid (desalting treatment and re-dispersing treatment)—" in Example 1A.

Each metal dispersion liquid of Examples 7A and 8A was prepared by mixing the first metal particle dispersion liquid and the second metal particle dispersion liquid prepared in the above-described manner such that the ratio (content of second metal particles/total content of first metal particles and second metal particles) of the content of the second metal particles to the total content of the first metal particles and the second metal particles in the metal dispersion liquid was set to the value listed in Table 1.

Example 9A

A gold dispersion liquid was prepared as the metal dispersion liquid of Example 9A.

3 L of 0.0005 M sodium citrate was added to a three-neck flask and heated to 50° C. while being stirred in a water bath.

A 2 L aqueous solution containing 0.0013 M tetrachloroauric (III) acid (HAuCl4) and 0.008 M cetylmethylammonium bromide was also heated and then poured into the sodium citrate aqueous solution after the temperature thereof reached 50° C. The resulting solution was stirred at 50° C. for 30 minutes, heated to 80° C., and allowed to react for 10 minutes. The liquid temperature was decreased to 40°, and the total amount of the same gelatin aqueous solution at 40° C. as the solution prepared in Example 1A was added to the reaction solution.

In the manner described above, a metal particle-forming liquid was obtained.

800 g of the metal particle-forming liquid prepared in the above-described manner was collected in a centrifuge tube, a centrifugation operation was performed thereon using a centrifuge (himacCR22GIII, angle rotor: R9A, manufactured by Hitachi Koki Co., Ltd.) under conditions of 35° C. at 9000 rpm for 60 minutes, and 784 g of the supernatant liquid was disposed of. 0.2 mmol/L of a NaOH aqueous solution was added to the remaining solid (in other words, a solid containing metal particles and gelatin) such that the total amount thereof was set to 40 g, and the solution was stirred by hand using a stirring rod, thereby obtaining a crude dispersion liquid X.

By performing the same operation as described above, 120 crude dispersion liquids X were prepared. All of these prepared crude dispersion liquids X (in other words, 4800 g in total) were added to a tank made of SUS316L and mixed. Next, 10 mL of a 10 g/L solution (as the solvent, a mixed solution of methanol and ion exchange water at a volume ratio of 1:1 was used) of Pluronic 31R1 (nonionic surfactant, manufactured by BASF SE) was further added thereto.

Next, a batch type dispersing treatment was performed on the mixture of the crude dispersion liquids X in the tank at 9000 rpm for 120 minutes using an automixer 20 type (manufactured by PRIMIX Corporation) (a homomixer MARKII as a stirring unit). The liquid temperature during the dispersing treatment was maintained at 50° C.

In the above-described manner, a metal dispersion liquid of Example 9A was prepared.

Preparation of Example 10A

—Preparation of First Metal Particle Dispersion Liquid—

A dispersion liquid (first metal particle dispersion liquid) containing only the first metal particles listed in Table 1 as the metal particles was prepared in the same manner as in Example 1A except that the entire supernatant after the centrifugal operation was performed was disposed of during the "—preparation of metal dispersion liquid (desalting treatment and re-dispersing treatment)—" in Example 1A.

—Preparation of Second Metal Particle Dispersion Liquid—

An additive solution A, an additive solution B, and an additive solution C shown below were prepared in advance.

[Additive Solution A]

0.51 g of silver nitrate powder was dissolved in 50 mL of pure water to obtain a dissolution solution.

1 N (1 mol/L) of ammonia water was added to the obtained dissolution solution until the dissolution solution became transparent, and pure water was added thereto such that the total amount of the solution reached 100 mL, thereby preparing the additive solution A.

[Additive Solution B]

0.5 g of glucose powder was dissolved in 140 mL of pure water, thereby preparing the additive solution B.

[Additive Solution C]

0.5 g of hexadecyltrimethylammonium bromide (HTAB) powder was dissolved in 27.5 mL of pure water, thereby preparing the additive solution C.

Next, 410 mL of pure water was poured into a three-neck flask, 82.5 mL of the additive solution C and 206 mL of the additive solution B were added thereto using a funnel while the solution was stirred at 20° C. to obtain a first solution (first stage). Next, the first solution was stirred at a stirring rotation rate of 800 rpm, 206 mL of the additive solution A was added to the first solution at a flow rate of 2.0 mL/min while the first solution was stirred to obtain a second solution (second stage). After 10 minutes, 30 mL of the additive solution C was added to the second solution to obtain a third solution (third stage). Next, the third solution was heated at 3° C./min until the internal temperature reached 75° C., the stirring rotation rate was decreased to 200 rpm, and the solution was heated at 75° C. for 5 hours, thereby obtaining an aqueous dispersion liquid.

An ultrafiltration module (model: SIP1013, molecular cutoff: 6000, manufactured by Asahi Kasei Corporation), a magnet pump, and a stainless steel cup were connected using a silicone tube, thereby preparing an ultrafiltration device. The ultrafiltration was performed by cooling the aqueous dispersion liquid obtained in the above-described manner, adding the aqueous dispersion liquid to the stainless steel cup of the prepared ultrafiltration device, and operating the pump. 950 mL of distilled water was added to the stainless steel cup at the time at which the amount of the filtrate from the ultrafiltration module reached 50 mL to perform washing. This washing was repeated until the conductivity of the filtrate reached 50 µS/cm or less, and the resulting solution was concentrated to prepare a dispersion liquid containing only the second metal particles (second metal particle dispersion liquid).

A metal dispersion liquid of Example 10A was prepared by mixing the first metal particle dispersion liquid and the second metal particle dispersion liquid prepared in the above-described manner such that the ratio (content of second metal particles/total content of first metal particles and second metal particles) of the content of the second metal particles to the total content of the first metal particles and the second metal particles in the metal dispersion liquid was set to the value listed in Table 1.

Example 11A

A metal dispersion liquid of Example 11A was prepared in the same manner as in Example 1A except that a 12 mass % aqueous solution of polyethyleneimine (weight-average molecular weight: 250000, manufactured by Polysciences, Inc.) was used in place of the gelatin aqueous solution during the "—preparation of metal particle-forming liquid—", the disposal amount of the supernatant after the centrifugal operation was performed was adjusted during the "—preparation of metal dispersion liquid (desalting treatment and re-dispersing treatment)—", and the ratio (content of second metal particles/total content of first metal particles and second metal particles) of the content of the second metal particles to the total content of the first metal particles and the second metal particles in the metal dispersion liquid in Example 1A was changed to the value listed in Table 1.

Example 12A

A metal dispersion liquid of Example 12A was prepared in the same manner as in Example 11A except that a 12 mass % aqueous solution of polyvinyl alcohol (PVA, product code: 04398-500, manufactured by Polysciences, Inc.) in place of the gelatin aqueous solution during the "—preparation of metal particle-forming liquid—" in Example 11A.

Example 13A

A metal dispersion liquid of Example 13A was prepared in the same manner as in Example 11A except that a 12 mass % aqueous solution of polyvinylpyrrolidone (PVP, trade name: polyvinylpyrrolidone K-30, manufactured by Polysciences, Inc.) in place of the gelatin aqueous solution during the "—preparation of metal particle-forming liquid—" in Example 11A.

Example 14A

A metal dispersion liquid of Example 14A was prepared in the same manner as in Example 1A except that the amount of the 0.10 g/L silver nitrate aqueous solution added to the liquid to which the sodium borohydride aqueous solution had been added was changed to "25 L" from "13 L" during the "—preparation of metal particle-forming liquid—" in Example 1A.

Example 15A

A metal dispersion liquid of Example 15A was prepared in the same manner as in Example 1A except that the amount of the 0.10 g/L silver nitrate aqueous solution added to the liquid to which the sodium borohydride aqueous solution had been added was changed to "1.3 L" from "13 L" during the "—preparation of metal particle-forming liquid—" in Example 1A.

Example 16A

A metal dispersion liquid of Example 16A was prepared in the same manner as in Example 1A except that the amount of the 0.10 g/L silver nitrate aqueous solution added to the liquid to which the sodium borohydride aqueous solution had been added was changed to "0.3 L" from "13 L" during the "—preparation of metal particle-forming liquid—" in Example 1A.

Comparative Example 1A

A metal dispersion liquid of Comparative Example 1A was prepared in the same manner as in Example 1A except that the entire supernatant after the centrifugal operation was performed was disposed of during the "—preparation of metal dispersion liquid (desalting treatment and re-dispersing treatment)—" in Example 1A Comparative Example 2A A metal dispersion liquid of Comparative Example 2A was prepared in the same manner as in Example 1A except that the disposal amount of the supernatant after the centrifugal operation was performed was adjusted during the "—preparation of metal dispersion liquid (desalting treatment and re-dispersing treatment)—" and the ratio (content of second metal particles/total content of first metal particles and second metal particles) of the content of the second metal particles to the total content of the first metal particles and the second metal particles in the metal dispersion liquid in Example 1A was set to the value listed in Table 2.

Comparative Example 3A

A metal dispersion liquid of Comparative Example 3A was prepared in the same manner as in Example 1A except that the timing of addition of "5.0 L of a 1N (mol/L) sodium hydroxide (NaOH) aqueous solution" during the "—preparation of metal particle-forming liquid—" was quickened, the disposal amount of the supernatant after the centrifugal operation was performed was adjusted during the "—preparation of metal dispersion liquid (desalting treatment and re-dispersing treatment)—", and the ratio (content of second metal particles/total content of first metal particles and second metal particles) of the content of the second metal particles to the total content of the first metal particles and the second metal particles in the metal dispersion liquid in Example 1A was changed to the value listed in Table 2.

Comparative Example 4A

A dispersion liquid (first metal particle dispersion liquid) containing only the first metal particles listed in Table 2 as the metal particles was prepared in the same manner as in Example 1A except that the entire supernatant after the centrifugal operation was performed was disposed of during the "—preparation of metal dispersion liquid (desalting treatment and re-dispersing treatment)—" in Example 1A. Further, a dispersion liquid (second metal particle dispersion liquid) containing only the second metal particles listed in Table 2 as the metal particles was prepared in the same manner as in Example 1A except that the timing of addition of "5.0 L of a 1N (mol/L) sodium hydroxide (NaOH) aqueous solution" was quickened during the "—preparation of metal particle-forming liquid—" and the entire supernatant after the centrifugal operation was performed was disposed of during the "—preparation of metal dispersion liquid (desalting treatment and re-dispersing treatment)—" in Example 1A.

A metal dispersion liquid of Comparative Example 4A was prepared by mixing the first metal particle dispersion liquid and the second metal particle dispersion liquid prepared in the above-described manner such that the ratio (content of second metal particles/total content of first metal particles and second metal particles) of the content of the second metal particles to the total content of the first metal particles and the second metal particles in the metal dispersion liquid was set to the value listed in Table 2.

Comparative Example 5A

A metal dispersion liquid of Comparative Example 5A was prepared in the same manner as in Example 1A except that the timing of addition of "5.0 L of a 1N (mol/L) sodium hydroxide (NaOH) aqueous solution" during the "—preparation of metal particle-forming liquid—" was quickened, the disposal amount of the supernatant after the centrifugal operation was performed was adjusted during the "—preparation of metal dispersion liquid (desalting treatment and re-dispersing treatment)—", and the ratio (content of second metal particles/total content of first metal particles and second metal particles) of the content of the second metal particles to the total content of the first metal particles and the second metal particles in the metal dispersion liquid in Example 1A was changed to the value listed in Table 2.

Comparative Example 6A

A metal dispersion liquid of Comparative Example 6A was prepared in the same manner as in Example 1A except that the amount of the 0.10 g/L silver nitrate aqueous solution added to the liquid to which the sodium borohydride aqueous solution had been added was changed to "30 L" from "13 L" during the "—preparation of metal particle-forming liquid—" in Example 1A.

Comparative Example 7A

A metal dispersion liquid of Comparative Example 7A was prepared in the same manner as in Example 1A except that the amount of the 0.10 g/L silver nitrate aqueous solution added to the liquid to which the sodium borohydride aqueous solution had been added was changed to "0.25 L" from "13 L" during the "—preparation of metal particle-forming liquid—" in Example 1A.

Comparative Example 8A

A dispersion liquid (first metal particle dispersion liquid) containing only the first metal particles listed in Table 2 as the metal particles was prepared in the same manner as in Example 1A except that the amount of the 0.10 g/L silver nitrate aqueous solution added to the liquid to which the sodium borohydride aqueous solution had been added was changed to "1.3 L" from "13 L" during the "—preparation of metal particle-forming liquid—" and the entire supernatant after the centrifugal operation was performed was disposed of during the "—preparation of metal dispersion liquid (desalting treatment and re-dispersing treatment)—" in Example 1A.

Further, a dispersion liquid (second metal particle dispersion liquid) containing only the second metal particles listed in Table 2 as the metal particles was prepared in the same manner as in Example 1A except that the timing of addition of "5.0 L of a 1N (mol/L) sodium hydroxide (NaOH) aqueous solution" was quickened during the "—preparation of metal particle-forming liquid—" and the entire supernatant after the centrifugal operation was performed was disposed of during the "—preparation of metal dispersion liquid (desalting treatment and re-dispersing treatment)—" in Example 1A.

A metal dispersion liquid of Comparative Example 8A was prepared by mixing the first metal particle dispersion liquid and the second metal particle dispersion liquid prepared in the above-described manner such that the ratio (content of second metal particles/total content of first metal particles and second metal particles) of the content of the second metal particles to the total content of the first metal particles and the second metal particles in the metal dispersion liquid was set to the value listed in Table 2.

Comparative Example 9A

A dispersion liquid (first metal particle dispersion liquid) containing only the first metal particles listed in Table 2 as the metal particles was prepared in the same manner as in Example 1A except that the amount of the 0.10 g/L silver nitrate aqueous solution added to the liquid to which the sodium borohydride aqueous solution had been added was changed to "25 L" from "13 L" during the "—preparation of metal particle-forming liquid—" and the entire supernatant after the centrifugal operation was performed was disposed of during the "—preparation of metal dispersion liquid (desalting treatment and re-dispersing treatment)—" in Example 1A.

Further, a dispersion liquid (second metal particle dispersion liquid) containing only the second metal particles listed in Table 2 as the metal particles was prepared in the same manner as in Example 1A except that the timing of addition of "5.0 L of a 1N (mol/L) sodium hydroxide (NaOH) aqueous solution" was quickened during the "—preparation of metal particle-forming liquid—" and the entire supernatant after the centrifugal operation was performed was disposed of during the "—preparation of metal dispersion liquid (desalting treatment and re-dispersing treatment)—" in Example 1A.

A metal dispersion liquid of Comparative Example 9A was prepared by mixing the first metal particle dispersion liquid and the second metal particle dispersion liquid prepared in the above-described manner such that the ratio (content of second metal particles/total content of first metal particles and second metal particles) of the content of the second metal particles to the total content of the first metal particles and the second metal particles in the metal dispersion liquid was set to the value listed in Table 2.

Each metal dispersion liquid of Examples 2A to 16A and Comparative Examples 1A to 9A was confirmed (shape) and measured (the average equivalent circle diameter, the average thickness, and the average aspect ratio) in the same manners as those for the metal dispersion liquid in Example 1A. The results are listed in Tables 1 and 2.

For example, in the "—preparation of metal particle-forming liquid—" at the time of preparation of the metal dispersion liquid, the thickness was increased and the average aspect ratio was decreased by quickening the timing of addition of "1 N (mol/L) of a 5.0 L sodium hydroxide (NaOH) aqueous solution" (for example, "1 N (mol/L) of a 5.0 L sodium hydroxide (NaOH) aqueous solution" was added before the change in pH of the liquid to which the silver sulfite white precipitate mixed solution had been added was stopped). Further, the average equivalent circle diameter of the metal particles to be formed was further increased and the average aspect ratio was further increased by reducing the amount of "0.10 g/L of a 13 L silver nitrate aqueous solution" to be added.

[Evaluation]

Each metal dispersion liquid of Examples 1A to 16A and Comparative Examples 1A to 9A was evaluated in the following manner. The results are listed in Tables 1 and 2.

1. Dispersion Stability of Metal Dispersion Liquid

The dispersion stability of the metal dispersion liquid was evaluated by measuring a change in particle diameter of the particles contained in the metal dispersion liquid with time based on the degree of an increase in particle diameter due to aggregation of particles. Specifically, the dispersion stability was evaluated according to the following method.

An average particle diameter X of the particles contained in the metal dispersion liquid immediately after preparation in the above-described manner was measured using a fiber-optics particle analyzer (FPAR-1000, manufactured by Otsuka Electronics Co., Ltd.).

In addition, the metal dispersion liquid prepared in the above-described manner was stored for a month under an ambient temperature condition of 30° C., and an average particle diameter Y of the particles contained in the stored metal dispersion liquid was measured using a fiber-optics particle analyzer (FPAR-1000, manufactured by Otsuka Electronics Co., Ltd.).

A ratio ((measured value of average particle diameter Y−measured value of average particle diameter X)/measured value of average particle diameter X×100 (unit: %); hereinafter, referred to as "[(Y−X)/X]×100") of an increase in particle diameter of the particles contained in the metal dispersion liquid with time was calculated based on the obtained measured value of the average particle diameter X and the obtained measured value of the average particle diameter Y. The dispersion stability of the metal dispersion liquid was evaluated based on the obtained value according to the following evaluation standards.

As the numerical value of Y/X decreases, this indicates that the dispersion stability of the metal dispersion liquid is excellent.

In a case where the evaluation result was "5", "4", or "3", it was determined that the ink was suitable for practical use.

~Evaluation Standards~

5: [(Y−X)/X]×100≤5%
4: 5%<[(Y−X)/X]×100≤10%
3: 10%<[(Y−X)/X]×100≤20%
2: 20%<[(Y−X)/X]×100≤50%
1: 50%<[(Y−X)/X]×100

TABLE 1

| | Metal particles | | | | | | | | |
|---|---|---|---|---|---|---|---|---|---|
| | First metal particles | | | | | Second metal particles | | | |
| | Kind of metal | Shape | Average equivalent circle diameter [nm] | Average aspect ratio | Content [% by mass] | Kind of metal | Shape | Average equivalent circle diameter [nm] | Average aspect ratio |
| Example 1A | Silver | Tabular | 150 | 25 | 4.9995 | Silver | Circular | 50 | 1 |
| Example 2A | Silver | Tabular | 150 | 25 | 4.95 | Silver | Circular | 50 | 1 |
| Example 3A | Silver | Tabular | 150 | 25 | 4.25 | Silver | Circular | 50 | 1 |
| Example 4A | Silver | Tabular | 150 | 25 | 4.00 | Silver | Circular | 50 | 1 |
| Example 5A | Silver | Tabular | 150 | 25 | 3.50 | Silver | Circular | 50 | 1 |
| Example 6A | Silver | Tabular | 130 | 21 | 4.50 | Silver | Circular | 50 | 1 |
| Example 7A | Silver | Tabular | 150 | 25 | 4.50 | Silver | Tabular | 70 | 7 |
| Example 8A | Silver | Tabular | 150 | 25 | 4.50 | Silver | Tabular | 120 | 14 |
| Example 9A | Gold | Tabular | 1000 | 100 | 4.50 | Gold | Circular | 50 | 1 |
| Example 10A | Silver | Tabular | 150 | 25 | 4.50 | Silver | Rod-like | 50 | 7 |
| Example 11A | Silver | Tabular | 150 | 25 | 4.50 | Silver | Circular | 50 | 1 |
| Example 12A | Silver | Tabular | 150 | 25 | 4.50 | Silver | Circular | 50 | 1 |
| Example 13A | Silver | Tabular | 150 | 25 | 4.50 | Silver | Circular | 50 | 1 |
| Example 14A | Silver | Tabular | 60 | 21 | 4.50 | Silver | Circular | 50 | 1 |
| Example 15A | Silver | Tabular | 500 | 60 | 4.50 | Silver | Circular | 50 | 1 |
| Example 16A | Silver | Tabular | 1000 | 100 | 4.50 | Silver | Circular | 50 | 1 |

| | Metal particles | | Dispersant | | Evaluation result |
|---|---|---|---|---|---|
| | Second metal particles Content [% by mass] | Content of second metal particles/total content of first metal particles and second metal particles | Kind of dispersant | Proportion in total amount of metal particles [% by mass] | Dispersion stability |
| Example 1A | 0.0005 | 0.0001 | Gelatin | 15 | 5 |
| Example 2A | 0.05 | 0.01 | Gelatin | 15 | 5 |
| Example 3A | 0.75 | 0.15 | Gelatin | 15 | 5 |
| Example 4A | 1.00 | 0.20 | Gelatin | 15 | 5 |

TABLE 1-continued

| | | | | | |
|---|---|---|---|---|---|
| Example 5A | 1.50 | 0.30 | Gelatin | 15 | 5 |
| Example 6A | 0.50 | 0.10 | Gelatin | 15 | 5 |
| Example 7A | 0.50 | 0.10 | Gelatin | 15 | 4 |
| Example 8A | 0.50 | 0.10 | Gelatin | 15 | 3 |
| Example 9A | 0.50 | 0.10 | Gelatin | 15 | 4 |
| Example 10A | 0.50 | 0.10 | Gelatin | 15 | 5 |
| Example 11A | 0.50 | 0.10 | Polyethyleneimine | 15 | 4 |
| Example 12A | 0.50 | 0.10 | PVA | 15 | 4 |
| Example 13A | 0.50 | 0.10 | PVP | 15 | 4 |
| Example 14A | 0.50 | 0.10 | Gelatin | 15 | 5 |
| Example 15A | 0.50 | 0.10 | Gelatin | 15 | 5 |
| Example 16A | 0.50 | 0.10 | Gelatin | 15 | 4 |

TABLE 2

| | Metal particles | | | | | | | | | Dispersant | | Evaluation result |
|---|---|---|---|---|---|---|---|---|---|---|---|---|
| | First metal particles | | | | | Second metal particles | | | | Content of second metal particles/total content of first metal particles and second metal particles | Kind of dispersant | Proportion in total amount of metal particles [% by mass] | Dispersion stability |
| | Kind of metal | Shape | Average equivalent circle diameter [nm] | Average aspect ratio | Content [% by mass] | Kind of metal | Shape | Average equivalent circle diameter [nm] | Average aspect ratio | Content [% by mass] | | | | |
| Comparative Example 1A | Silver | Tabular | 150 | 25 | 5.00 | — | — | — | — | — | — | Gelatin | 15 | 2 |
| Comparative Example 2A | Silver | Tabular | 150 | 25 | 2.50 | Silver | Circular | 50 | 1 | 2.50 | 0.50 | Gelatin | 15 | 5 |
| Comparative Example 3A | Silver | Tabular | 80 | 10 | 4.50 | Silver | Circular | 50 | 1 | 0.50 | 0.10 | Gelatin | 15 | 5 |
| Comparative Example 4A | Silver | Tabular | 150 | 25 | 4.50 | Silver | Circular | 120 | 16 | 0.50 | 0.10 | Gelatin | 15 | 2 |
| Comparative Example 5A | Silver | Tabular | 120 | 15 | 4.50 | Silver | Circular | 50 | 1 | 0.50 | 0.10 | Gelatin | 15 | 5 |
| Comparative Example 6A | Silver | Tabular | 40 | 21 | 4.50 | Silver | Circular | 50 | 1 | 0.50 | 0.10 | Gelatin | 15 | 5 |
| Comparative Example 7A | Silver | Tabular | 1100 | 110 | 4.50 | Silver | Circular | 50 | 1 | 0.50 | 0.10 | Gelatin | 15 | 2 |
| Comparative Example 8A | Silver | Tabular | 500 | 60 | 4.50 | Silver | Circular | 160 | 1 | 0.50 | 0.10 | Gelatin | 15 | 2 |
| Comparative Example 9A | Silver | Tabular | 60 | 21 | 4.50 | Silver | Circular | 100 | 1 | 0.50 | 0.10 | Gelatin | 15 | 2 |

In Table 1 and Table 2, "-" indicates that the corresponding one is not available.

As listed in Table 1, each metal dispersion liquid of Examples 1A to 16A which contained the tabular metal particles having an average aspect ratio of greater than 20 and an average equivalent circle diameter of 50 nm to 1000 nm, the metal particles having an average aspect ratio of 1 to 15 and an average equivalent circle diameter of 1 nm to 150 nm, and water and in which the average equivalent circle diameter A1 of the tabular metal particles and the average equivalent circle diameter B1 of the metal particles B satisfied Expression (1), and the content a of the tabular metal particles A and the content b of the metal particles with respect to the total mass of the metal dispersion liquid satisfied Expression (2) had excellent dispersion stability.

In addition, as listed in Table 2, the metal dispersion liquid of Comparative Example 1A which contained the tabular metal particles having an average aspect ratio of greater than 20 and an average equivalent circle diameter of 50 nm to 1000 nm and did not contain the metal particles having an average aspect ratio of 1 to 15 and an average equivalent circle diameter of 1 nm to 150 nm had degraded dispersion stability.

Further, the metal dispersion liquid of Comparative Example 4A which contained the tabular metal particles having an average aspect ratio of greater than 20 and an average equivalent circle diameter of 50 nm to 1000 nm and the metal particles having an average equivalent circle diameter of 1 nm to 150 nm and an average aspect ratio of greater than 15 also had degraded dispersion stability.

The metal dispersion liquid of Comparative Example 7A which contained the tabular metal particles having an average aspect ratio of greater than 20 and an average equivalent circle diameter of greater than 1000 nm and the metal particles having an average aspect ratio of 1 to 15 and an average equivalent circle diameter of 1 nm to 150 nm also had degraded dispersion stability.

The metal dispersion liquid of Comparative Example 8A which contained the tabular metal particles having an average aspect ratio of greater than 20 and an average equivalent circle diameter of 50 nm to 1000 nm and the metal particles having an average aspect ratio of 1 to 15 and an average equivalent circle diameter of greater than 150 nm had degraded dispersion stability.

The metal dispersion liquid of Comparative Example 9A in which the average equivalent circle diameter A1 of the tabular metal particles and the average equivalent circle diameter B1 of the metal particles did not satisfy Expression (1) had degraded dispersion stability.

[Preparation of Ink for Ink Jet Recording]

Examples 1B to 16B and Comparative Examples 1B to 9B

Each ink for ink jet recording with the following composition was prepared using each metal dispersion liquid of Examples 1A to 16A and Comparative Examples 1A to 9A prepared in the above-described manner.

The prepared ink for ink jet recording is also an aspect of the metal dispersion liquid.

In the present examples, each ink for ink jet recording prepared here was referred to as an "ink" and distinguished from the metal dispersion liquid prepared in the above-described manner.

—Composition of Ink—

| | |
|---|---|
| Metal particles listed | 2% by mass |
| Dispersant described in Table 3 or 4 | the amount listed in Table 3 or 4 |

-continued

| | |
|---|---|
| Propylene glycol (organic solvent, boiling point: 188° C., SP value: 27.6 (MPa)$^{1/2}$) | 30% by mass |
| SURFLON (registered trademark) S-243 (a fluorine-based surfactant containing a perfluoro group, refractive index: 1.35, manufactured by AGC SEIMI CHEMICAL CO., LTD.) | 0.15% by mass |
| Ion exchange water | the remaining amount set such that the total amount of the composition was 100% by mass |

—Shape and Size of Metal Particles Contained Ink—

The shape and the size (specifically, the average equivalent circle diameter, the average thickness, and the average aspect ratio) of the metal particles contained in the ink were confirmed according to the same methods as those for the metal particles contained in the metal dispersion liquid.

The results are listed in Tables 3 and 4.

—Image Recording—

A cartridge (model number: Dimatix Materials Cartridge (Jetpowerd)) dedicated to an ink jet printer (model number: DMP-2831, manufactured by FUJIFILM DIMATIX, Inc.) was filled with the ink prepared in the above-described manner. Next, the dedicated cartridge filled with the ink was set in an ink jet printer. The dedicated cartridge has a structure in which the ink cartridge and the ink jet head are integrated with each other. The ink jet head has nozzles with a nozzle diameter of 21.5 μm and the number of nozzles thereof is 16.

Next, the ink was jetted onto glossy paper (Kassai (registered trademark) photofinishing product Pro, ink jet paper, manufactured by Fujifilm Corporation) serving as a base material at room temperature under jetting conditions of an ink droplet amount of 2.8 pL, a jetting frequency of 25.5 kHz, and a resolution of 1200 dpi×1200 dpi (dot per inch; the same applies hereinafter), and a solid image (length of 70 mm×width of 30 mm) was recorded on the glossy paper. After the solid image was recorded, the solid image was completely dried.

[Evaluation]

1. Specular Glossiness of Image (1) Evaluation Based on Gloss Value

The 20° gloss value of the dried solid image was measured using a gloss watch (micro-TRI-gloss, manufactured by BYK-Chemie GmbH). Based on the obtained measured value of the 20° gloss value, the specular glossiness of the image was evaluated according to the following evaluation standards. The evaluation results are listed in Tables 3 and 4.

As the 20° gloss value increases, this means that the specular glossiness of the image is excellent.

In a case where the evaluation result was "5", "4", or "3", it was determined that the ink was suitable for practical use.

~Evaluation Standards~

5: The 20° gloss value was 800 or greater.

4: The 20° gloss value was 600 or greater and less than 800.

3: The 20° gloss value was 300 or greater and less than 600.

2: The 20° gloss value was 150 or greater and less than 300.

1: The 20° gloss value was less than 150.

(2) Sensory Evaluation

The specular glossiness of the image was evaluated by visually observing the dried solid image. The evaluation results are listed in Tables 3 and 4.

The evaluation standards are as follows.

In a case where the evaluation result was "5", "4", or "3", it was determined that the ink was suitable for practical use.

~Evaluation Standards~

5: The image had extremely excellent specular glossiness, and the reflected object was clearly seen like a mirror image.

4: The image had excellent specular glossiness, and the reflected image was able to be identified.

3: The image had specular glossiness, but the reflected object was not able to be identified.

2: The image had weak metallic tone gloss, but did not have specular glossiness, and thus an object was not reflected.

1: The image did not have gloss and was seen to be gray.

2. Tint of Image

Using an ultraviolet-visible near infrared spectrophotometer (V-660, manufactured by JASCO Corporation), the reflection tint of specular reflection of the dried solid image was measured. The metric saturation $c^*$ was calculated from the obtained measured values of $a^*$ and $b^*$ based on Calculation Formula $(a^{*2}+b^{*2})^{1/2}$. Based on the obtained value of the metric saturation $c^*$, the tint of the image was evaluated according to the following evaluation standards. The evaluation results are listed in Tables 3 and 4.

As the value of the metric saturation $c^*$ decreases, this indicates that the tint of the image is suppressed (that is, the image is an image with a neutral tint).

In a case where the evaluation result was "5", "4", or "3", it was determined that the ink was suitable for practical use.

~Evaluation Standards~

5: $c^*<10$

4: $10 \leq c^* < 15$

3: $15 \leq c^* < 20$

2: $20 \leq c^* < 25$

1: $25 \leq c^*$

3. Jettability of Ink

At the time of recording solid images in the [image recording] described above, the state of ink jetted from a nozzle of an ink jet head was imaged by a camera attached to an ink jet printer DMP-2831. The captured image was observed, the incidence rate of the separation or liquid separation in 100 ink droplets was acquired, and the jettability was evaluated based on the evaluation following standards. The results are listed in Tables 3 and 4.

Further, the "separation" indicates that the liquid droplets are separated back and forth in the traveling direction of the ink droplets, and the "liquid separation" indicates that the liquid droplets are scattered in a direction different from the ideal traveling direction at the time of ink jetting.

In a case where the evaluation result was "5", "4", or "3", it was determined that the ink was suitable for practical use.

~Evaluation Standards~
5: The incidence rate of separation of jetted ink droplets or liquid separation in jetted ink droplets was less than 1%.

4: The incidence rate of separation of jetted ink droplets or liquid separation in jetted ink droplets was 1% or greater and less than 5%.

3: The incidence rate of separation of jetted ink droplets or liquid separation in jetted ink droplets was 5% or greater and less than 20%.

2: The incidence rate of separation of jetted ink droplets or liquid separation in jetted ink droplets was 20% or greater and less than 50%.

1: The incidence rate of separation of jetted ink droplets or liquid separation in jetted ink droplets was 50% or greater.

TABLE 3

| | Metal particles | | | | | | | | |
|---|---|---|---|---|---|---|---|---|---|
| | First metal particles | | | | | Second metal particles | | | |
| | Kind of metal | Shape | Average equivalent circle diameter [nm] | Average aspect ratio | Content [% by mass] | Kind of metal | Shape | Average equivalent circle diameter [nm] | Average aspect ratio | Content [% by mass] |
| Example 1B | Silver | Tabular | 150 | 25 | 4.9995 | Silver | Circular | 50 | 1 | 0.0005 |
| Example 2B | Silver | Tabular | 150 | 25 | 4.95 | Silver | Circular | 50 | 1 | 0.05 |
| Example 3B | Silver | Tabular | 150 | 25 | 4.25 | Silver | Circular | 50 | 1 | 0.75 |
| Example 4B | Silver | Tabular | 150 | 25 | 4.00 | Silver | Circular | 50 | 1 | 1.00 |
| Example 5B | Silver | Tabular | 150 | 25 | 3.50 | Silver | Circular | 50 | 1 | 1.50 |
| Example 6B | Silver | Tabular | 130 | 21 | 4.50 | Silver | Circular | 50 | 1 | 0.50 |
| Example 7B | Silver | Tabular | 150 | 25 | 4.50 | Silver | Tabular | 70 | 7 | 0.50 |
| Example 8B | Silver | Tabular | 150 | 25 | 4.50 | Silver | Tabular | 120 | 14 | 0.50 |
| Example 9B | Gold | Tabular | 1000 | 100 | 4.50 | Gold | Circular | 50 | 1 | 0.50 |
| Example 10B | Silver | Tabular | 150 | 25 | 4.50 | Silver | Rod-like | 50 | 7 | 0.50 |
| Example 11B | Silver | Tabular | 150 | 25 | 4.50 | Silver | Circular | 50 | 1 | 0.50 |
| Example 12B | Silver | Tabular | 150 | 25 | 4.50 | Silver | Circular | 50 | 1 | 0.50 |
| Example 13B | Silver | Tabular | 150 | 25 | 4.50 | Silver | Circular | 50 | 1 | 0.50 |
| Example 14B | Silver | Tabular | 60 | 21 | 4.50 | Silver | Circular | 50 | 1 | 0.50 |
| Example 15B | Silver | Tabular | 500 | 60 | 4.50 | Silver | Circular | 50 | 1 | 0.50 |
| Example 16B | Silver | Tabular | 1000 | 100 | 4.50 | Silver | Circular | 50 | 1 | 0.50 |

TABLE 3-continued

| | Metal particles Content of second metal particles/total content of first metal particles and second metal particles | Dispersant Kind of dispersant | Proportion in total amount of metal particles [% by mass] | Specular glossiness 20° gloss value | Evaluation result Sensory evaluation | Tint of image | Jettability of ink |
|---|---|---|---|---|---|---|---|
| Example 1B | 0.0001 | Gelatin | 10 | 5 | 5 | 5 | 5 |
| Example 2B | 0.01 | Gelatin | 10 | 5 | 5 | 5 | 5 |
| Example 3B | 0.15 | Gelatin | 10 | 5 | 5 | 5 | 5 |
| Example 4B | 0.20 | Gelatin | 10 | 4 | 4 | 5 | 5 |
| Example 5B | 0.30 | Gelatin | 10 | 4 | 4 | 4 | 5 |
| Example 6B | 0.10 | Gelatin | 10 | 5 | 5 | 5 | 5 |
| Example 7B | 0.10 | Gelatin | 10 | 5 | 5 | 4 | 5 |
| Example 8B | 0.10 | Gelatin | 10 | 5 | 5 | 4 | 4 |
| Example 9B | 0.10 | Gelatin | 10 | 4 | 4 | 3 | 4 |
| Example 10B | 0.10 | Gelatin | 10 | 5 | 5 | 4 | 5 |
| Example 11B | 0.10 | Polyethyleneimine | 10 | 4 | 5 | 5 | 4 |
| Example 12B | 0.10 | PVA | 10 | 4 | 5 | 5 | 4 |
| Example 13B | 0.10 | PVP | 10 | 4 | 5 | 5 | 4 |
| Example 14B | 0.10 | Gelatin | 10 | 4 | 4 | 5 | 5 |
| Example 15B | 0.10 | Gelatin | 10 | 5 | 5 | 5 | 5 |
| Example 16B | 0.10 | Gelatin | 10 | 5 | 5 | 5 | 4 |

TABLE 4

| | Metal particles | | | | | | | | |
|---|---|---|---|---|---|---|---|---|---|
| | First metal particles | | | | | Second metal particles | | | |
| | Kind of metal | Shape | Average equivalent circle diameter [nm] | Average aspect ratio | Content [% by mass] | Kind of metal | Shape | Average equivalent circle diameter [nm] | Average aspect ratio | Content [% by mass] |
| Comparative Example 1B | Silver | Tabular | 150 | 25 | 5.00 | — | — | — | — | — |
| Comparative Example 2B | Silver | Tabular | 150 | 25 | 2.50 | Silver | Circular | 50 | 1 | 2.50 |
| Comparative Example 3B | Silver | Tabular | 80 | 10 | 4.50 | Silver | Circular | 50 | 1 | 0.50 |
| Comparative Example 4B | Silver | Tabular | 150 | 25 | 4.50 | Silver | Circular | 120 | 16 | 0.50 |
| Comparative Example 5B | Silver | Tabular | 120 | 15 | 4.50 | Silver | Circular | 50 | 1 | 0.50 |
| Comparative Example 6B | Silver | Tabular | 40 | 21 | 4.50 | Silver | Circular | 30 | 1 | 0.50 |
| Comparative Example 7B | Silver | Tabular | 1100 | 110 | 4.50 | Silver | Circular | 50 | 1 | 0.50 |
| Comparative Example 8B | Silver | Tabular | 500 | 60 | 4.50 | Silver | Circular | 160 | 1 | 0.50 |
| Comparative Example 9B | Silver | Tabular | 60 | 21 | 4.50 | Silver | Circular | 100 | 1 | 0.50 |

| | Metal particles Content of second metal particles/total content of first metal particles and second metal particles | Dispersant Kind of dispersant | Proportion in total amount of metal particles [% by mass] | Specular glossiness 20° gloss value | Evaluation result Sensory evaluation | Tint of image | Jettability of ink |
|---|---|---|---|---|---|---|---|
| Comparative Example 1B | — | Gelatin | 10 | 3 | 4 | 5 | 3 |
| Comparative Example 2B | 0.50 | Gelatin | 10 | 2 | 2 | 2 | 4 |

TABLE 4-continued

| | | | | | | | |
|---|---|---|---|---|---|---|---|
| Comparative Example 3B | 0.10 | Gelatin | 10 | 4 | 4 | 2 | 4 |
| Comparative Example 4B | 0.10 | Gelatin | 10 | 5 | 5 | 4 | 3 |
| Comparative Example 5B | 0.10 | Gelatin | 10 | 3 | 2 | 2 | 5 |
| Comparative Example 6B | 0.10 | Gelatin | 10 | 2 | 2 | 5 | 5 |
| Comparative Example 7B | 0.10 | Gelatin | 10 | 5 | 5 | 5 | 3 |
| Comparative Example 8B | 0.10 | Gelatin | 10 | 3 | 3 | 2 | 2 |
| Comparative Example 9B | 0.10 | Gelatin | 10 | 3 | 3 | 2 | 2 |

In Table 3 and Table 4, "-" indicates that the corresponding one is not available.

In Table 3 and Table 4, the "content [% by mass]" in the columns of the first metal particles and the second metal particles indicates the content thereof with respect to the total mass of the ink.

As listed in Table 3, according to each ink of Examples 1A to 16A which contained the tabular metal particles having an average aspect ratio of greater than 20 and an average equivalent circle diameter of 50 nm to 1000 nm, the metal particles having an average aspect ratio of 1 to 15 and an average equivalent circle diameter of 1 nm to 150 nm, and water and in which the average equivalent circle diameter A1 of the tabular metal particles and the average equivalent circle diameter B1 of the metal particles B satisfied Expression (1), and the content a of the tabular metal particles A and the content b of the metal particles with respect to the total mass of the metal dispersion liquid satisfied Expression (2), an image having specular glossiness was able to be recorded. Further, the image recorded using any ink of Examples 1B to 16B had a suppressed tint. Further, each ink of Examples 1B to 16B had excellent jettability from a nozzle of an ink jet head (hereinafter, also simply referred to as "jettability").

In addition, as listed in Table 4, the jettability of the ink of Comparative Example 1B which contained the tabular metal particles having an average aspect ratio of greater than 20 and an average equivalent circle diameter of 50 nm to 1000 nm and did not contain the metal particles having an average aspect ratio of 1 to 15 and an average equivalent circle diameter of 1 nm to 150 nm was not problematic in practical use, but was likely to deteriorate compared to the ink of each example.

The image recorded using the ink of Comparative Example 2B which contained the tabular metal particles having an average aspect ratio of greater than 20 and an average equivalent circle diameter of 50 nm to 1000 nm, the metal particles having an average aspect ratio of 1 to 15 and an average equivalent circle diameter of 1 nm to 150 nm, and water and in which the average equivalent circle diameter A1 of the tabular metal particles and the average equivalent circle diameter B1 of the metal particles B satisfied Expression (1), and the content a of the tabular metal particles A and the content b of the metal particles with respect to the total mass of the metal dispersion liquid did not satisfy Expression (2) was significantly tinted and did not have specular glossiness.

The image recorded using each ink of Comparative Examples 3B and 5B which contained the tabular metal particles having an average aspect ratio of 20 or less and an average equivalent circle diameter of 50 nm to 1000 nm and the metal particles having an average aspect ratio of 1 to 15 and an average equivalent circle diameter of 1 nm to 150 nm was significantly tinted.

The jettability of the ink of Comparative Example 4B which contained the tabular metal particles having an average aspect ratio of greater than 20 and an average equivalent circle diameter of 50 nm to 1000 nm and the metal particles having an average equivalent circle diameter of 1 nm to 150 nm and an average aspect ratio of greater than 15 was not problematic in practical use, but was likely to deteriorate compared to the ink of each example.

The image recorded using the ink of Comparative Example 6B which contained the tabular metal particles having an average aspect ratio of greater than 20 and an average equivalent circle diameter of less than 50 nm and the metal particles having an average aspect ratio of 1 to 15 and an average equivalent circle diameter of 1 nm to 150 nm did not have specular glossiness.

The jettability of the ink of Comparative Example 7B which contained the tabular metal particles having an average aspect ratio of greater than 20 and an average equivalent circle diameter of greater than 1000 nm and the metal particles an average aspect ratio of 1 to 15 and an average equivalent circle diameter of 1 nm to 150 nm was not problematic in practical use, but was likely to deteriorate compared to the ink of each example.

The image recorded using the ink of Comparative Example 8B which contained the tabular metal particles having an average aspect ratio of 20 or less and an average equivalent circle diameter of 50 nm to 1000 nm and the metal particles having an average aspect ratio of 1 to 15 and an average equivalent circle diameter of greater than 150 nm was significantly tinted. Further, the jettability of the ink of Comparative Example 8B was deteriorated.

The image recorded using the ink of Comparative Example 9B in which the average equivalent circle diameter A1 of the tabular metal particles and the average equivalent circle diameter B1 of the metal particles B did not satisfy Expression (1) was significantly tinted. Further, the jettability of the ink of Comparative Example 9B was deteriorated.

The entirety of the disclosure of JP2017-158891 filed on Aug. 21, 2017 is incorporated in the present specification by reference.

All documents, patent applications, and technical standards described in the present specification are incorporated herein by reference to the same extent as in a case of being specifically and individually noted that individual documents, patent applications, and technical standards are incorporated by reference.

What is claimed is:

1. A metal dispersion liquid comprising:
   tabular metal particles A having an average aspect ratio of greater than 20, which is a ratio of an average equivalent circle diameter to an average thickness, and an average equivalent circle diameter of 50 nm to 1000 nm;
   metal particles B having an average aspect ratio of 1 to 15 and an average equivalent circle diameter of 1 nm to 150 nm; and
   water,
   wherein an average equivalent circle diameter A1 of the tabular metal particles A and an average equivalent circle diameter B1 of the metal particles B satisfy Expression (1), and
   a content a of the tabular metal particles A and a content b of the metal particles B with respect to a total mass of the metal dispersion liquid satisfy Expression (2):

$A1 > B1$     Expression (1)

$0.0001 \leq b/(a+b) \leq 0.3$     Expression (2).

2. The metal dispersion liquid according to claim 1, wherein the average aspect ratio of the metal particles B is 1 or greater and less than 8.

3. The metal dispersion liquid according to claim 1, wherein the tabular metal particles A contain at least one metal element selected from the group consisting of silver, gold, and platinum.

4. The metal dispersion liquid according to claim 1, wherein the tabular metal particles A contain silver.

5. The metal dispersion liquid according to claim 1, wherein the content a of the tabular metal particles A and the content b of the metal particles B with respect to the total mass of the metal dispersion liquid satisfy Expression (2-1):

$0.0001 \leq b/(a+b) \leq 0.2$     Expression (2-1).

6. The metal dispersion liquid according to claim 1, wherein the content a of the tabular metal particles A and the content b of the metal particles B with respect to the total mass of the metal dispersion liquid satisfy Expression (2-2):

$0.0001 \leq b/(a+b) \leq 0.15$     Expression (2-2).

7. The metal dispersion liquid according to claim 1, wherein the average equivalent circle diameter of the tabular metal particles A is in a range of 50 nm to 500 nm.

8. The metal dispersion liquid according to claim 1, wherein the average equivalent circle diameter of the metal particles B is in a range of 1 nm to 120 nm.

9. The metal dispersion liquid according to claim 1, further comprising:
   a dispersant.

10. The metal dispersion liquid according to claim 9, wherein the dispersant is gelatin.

11. The metal dispersion liquid according to claim 1, which is used as an ink.

12. The metal dispersion liquid according to claim 11, which is used for ink jet recording.

13. An image recording method comprising:
    applying the metal dispersion liquid according to claim 1 onto a base material using an ink jet method.

14. A metal dispersion liquid comprising:
    tabular metal particles A having an average aspect ratio of greater than 20, which is a ratio of an average equivalent circle diameter to an average thickness, and an average equivalent circle diameter of 50 nm to 500 nm;
    metal particles B having an average aspect ratio of 1 to 15 and an average equivalent circle diameter of 1 nm to 120 nm;
    water; and
    gelatin,
    wherein an average equivalent circle diameter A1 of the tabular metal particles A and an average equivalent circle diameter B1 of the metal particles B satisfy Expression (1), and
    a content a of the tabular metal particles A and a content b of the metal particles B with respect to a total mass of the metal dispersion liquid satisfy Expression (2):

$A1 > B1$     Expression (1)

$0.0001 \leq b/(a+b) \leq 0.3$     Expression (2).

15. A metal dispersion liquid comprising:
    tabular metal particles A containing silver and having an average aspect ratio of greater than 20, which is a ratio of an average equivalent circle diameter to an average thickness, and an average equivalent circle diameter of 50 nm to 500 nm;
    metal particles B having an average aspect ratio of 1 to less than 8 and an average equivalent circle diameter of 1 nm to 120 nm;
    water; and
    gelatin,
    wherein an average equivalent circle diameter A1 of the tabular metal particles A and an average equivalent circle diameter B1 of the metal particles B satisfy Expression (1), and
    a content a of the tabular metal particles A and a content b of the metal particles B with respect to a total mass of the metal dispersion liquid satisfy Expression (2-2):

$A1 > B1$     Expression (1)

$0.0001 \leq b/(a+b) \leq 0.3$     Expression (2).

* * * * *